(12) United States Patent
Sandusky

(10) Patent No.: US 8,398,511 B2
(45) Date of Patent: Mar. 19, 2013

(54) INFLATABLE LATEX NEOPRENE BLADDERS

(75) Inventor: Donald A. Sandusky, Landenberg, PA (US)

(73) Assignee: Warrior Sports, Inc., Warren, MI (US)

( * ) Notice: Subject to any disclaimer, the term of this patent is extended or adjusted under 35 U.S.C. 154(b) by 292 days.

(21) Appl. No.: 12/555,531

(22) Filed: Sep. 8, 2009

(65) Prior Publication Data
US 2010/0069183 A1 Mar. 18, 2010

Related U.S. Application Data

(60) Provisional application No. 61/094,845, filed on Sep. 5, 2008.

(51) Int. Cl.
*A63B 41/02* (2006.01)
(52) U.S. Cl. .................................. 473/604; 473/609
(58) Field of Classification Search ........ 473/603–605, 473/609, 611
See application file for complete search history.

(56) References Cited

U.S. PATENT DOCUMENTS

| | | | | |
|---|---|---|---|---|
| 3,199,871 A * | 8/1965 | Dorn | | 473/609 |
| 4,093,219 A * | 6/1978 | Piraud | | 473/604 |
| 5,244,429 A | 9/1993 | Sinclair | | |
| 6,087,016 A | 7/2000 | Feeney et al. | | |
| 6,127,026 A | 10/2000 | Bonk et al. | | |
| 6,232,389 B1 * | 5/2001 | Feeney et al. | | 524/450 |
| 6,398,894 B1 * | 6/2002 | Lee | | 156/147 |
| 6,413,177 B1 | 7/2002 | Guenther et al. | | |
| 6,503,162 B1 * | 1/2003 | Shishido et al. | | 473/605 |
| 6,544,608 B1 * | 4/2003 | Jain et al. | | 428/35.7 |
| 6,638,189 B2 | 10/2003 | Chang | | |
| 6,645,100 B2 | 11/2003 | Guenther et al. | | |
| 6,949,276 B2 * | 9/2005 | Jain et al. | | 428/36.8 |
| 6,971,965 B1 * | 12/2005 | Shishido | | 473/604 |
| 7,078,453 B1 | 7/2006 | Feeney et al. | | |
| 7,119,138 B1 * | 10/2006 | Feeney et al. | | 524/450 |
| 7,278,937 B2 | 10/2007 | Laliberty et al. | | |
| 7,503,861 B2 | 3/2009 | Swiszcz et al. | | |
| 7,537,814 B2 | 5/2009 | McInnis et al. | | |
| 7,611,429 B2 | 11/2009 | O'Neill et al. | | |
| 2006/0063622 A1 | 3/2006 | Nurnberg et al. | | |
| 2006/0205547 A1 * | 9/2006 | O'Neill et al. | | 473/599 |
| 2007/0060426 A1 | 3/2007 | Maziarz et al. | | |
| 2007/0123139 A1 * | 5/2007 | Warner et al. | | 446/186 |
| 2008/0176685 A1 | 7/2008 | Madore et al. | | |
| 2010/0029419 A1 * | 2/2010 | Magon et al. | | 473/599 |
| 2011/0111897 A1 * | 5/2011 | Taniguchi et al. | | 473/604 |

FOREIGN PATENT DOCUMENTS

| | | |
|---|---|---|
| DE | 8906767 | 7/1989 |
| WO | WO9425117 | 11/1994 |
| WO | 2008099421 | 8/2008 |

OTHER PUBLICATIONS

Goldberg, Harris A., et al., Elastomeric Barrier Coatings for Sporting Goods; white paper No. 17; InMat LLC; Hillsborough, New Jersey; 17 Pages.
Extended European Search Report, Appl. No. 09812401.9, dated Jan. 30, 2012.

* cited by examiner

*Primary Examiner* — Steven Wong
(74) *Attorney, Agent, or Firm* — Warner Norcross & Judd LLP

(57) ABSTRACT

The present invention relates to inflatable neoprene bladders and method of manufacturing inflatable neoprene bladders. The invention also relates to inflatable articles having an inflatable neoprene bladder wherein the article has an idealized shape and superior resiliency and air retention. Finally, the invention relates to sportsballs and gameballs having an inflatable neoprene bladder.

14 Claims, 14 Drawing Sheets

INFLATABLE LATEX NEOPRENE BLADDERS

CROSS REFERENCE TO RELATED APPLICATION

This application claims the benefit of U.S. Provisional Application No. 61/094,845 filed Sep. 5, 2008, the contents of which is incorporated herein by reference.

FIELD OF THE INVENTION

The present invention relates to inflatable latex neoprene bladders and methods of manufacturing inflatable latex neoprene bladders. The invention also relates to inflatable articles comprising an inflatable latex neoprene bladder wherein the article has an idealized shape and superior resiliency and air retention. Finally, the invention relates to sportsballs and gameballs comprising an inflatable latex neoprene bladder.

BACKGROUND

Inflatable sportsballs usually comprise rubber inner bladders and elastic outer casings. The outer casing must be durable and must support internal pressurization. Typically, however, the outer casing is not substantially air impermeable, and the inner bladder provides the air barrier. Upon inflation, the outer casing is stretched tightly over the internally pressurized rubber inner bladder so that the sportsball has high resiliency and liveliness for use.

After weight, quality and design are considered, four attributes measure the usefulness of an inner bladder. These attributes are shape, room-temperature rebound, low-temperature rebound and air retention. Bladder shape influences the manufacturing processes that can be employed as well as sportsball shape retention. It is preferable for the penultimate bladder shape to be substantially identical to the inner shell of the finished sportsball. Bladder rebound correlates directly to the resiliency of a pressurized sportsball. Both room-temperature rebound and low-temperature rebound correlate to a ball's performance in play. Higher rebound values are desirous. Sportsball inner bladders tend to exhibit viscoelastic behavior, as described by time-temperature-superposition interactions of polymeric materials. Superior low-temperature rebound corresponds to better liveliness when a ball is subjected to high speed impact, for example when kicking a soccer ball or spiking a volleyball. Bladders with desirable room-temperature rebound and desirable low-temperature rebound are superior. Finally, air retention performance directly correlates to a finished ball's ability to maintain playable air pressure over long periods of time.

Commercially available bladders possess either low air permeability or good bounce and rebound capabilities, but not both superior resiliency and air retention. This is evidenced by FIFA's (Federation Internationale de Football Association) international matchball standards for soccer balls. FIFA's international standard for shape retention is less than 2% ball sphericity, which is challenging, and FIFA's standard for ball rebound is at least 115 cm at room-temperature and at least 110 cm at low-temperature, which is also challenging. However, the standard only requires that soccer balls inflated to 1 atmosphere of air pressure can lose no more than 25% air pressure after 3 days elapsed time, which is passable by nearly any conventional rubber bladder material. These FIFA limits, while strict on playability, are soft on air retention, acknowledging that the state-of-the-art has not yet achieved a bladder technology that provides for roundness, resiliency and liveliness while also providing superior air retention.

Inflatable bladders are produced by several different processes. A large number of bladders are made by latex rubber dip molding and curing ("dip molding"). Dip molding produces a variety of multiple baffled shaped balloons which can be affixed with a valve house and an inflation valve forming a finished bladder. These bladders are popular because, for example, natural rubber latex dipped bladders exhibit very good resilience, superior rebound and playability characteristics. However, they exhibit poor air retention. Also, when in the inflated but un-stretched state, these bladders form non-ideal shapes. For example, FIG. 1 shows a conventional four (4) baffled dip mold. FIG. 2 shows the polygonal, prolate shaped bladder, made using conventional dip molding processes and the dip mold of FIG. 1. This polygonal prolate shape having bladder sphericity greater than 5% is the most common latex bladder shape because many latex dip molds can be packed closely to one another in the dip molding process. Additional baffles can be designed into dip molds rendering more rounded top views, (see FIGS. 3, 4 and 5). As seen in FIG. 4, which illustrates a bladder made using an eight (8) baffled dip mold, exhibiting more than 15% bladder sphericity. With multiple baffles, these bladders are more rounded in the equatorial plane, or from the top view, but are usually pumpkin shaped or oblate shaped from the side view. (See also FIG. 5 which illustrates yet another dip mold design, (10) baffles, that renders rubber ice bag shaped moldings having bladder sphericity greater than 20%). While the ideal dip mold would comprise an infinite number of baffles to form a truly geometric spherical shape, with zero bladder sphericity However, such a dip mold design is impossible for bladder formation because the resulting balloon neck diameter would be too small to strip the balloon over the mold's large diameter without breaking or tearing. Further, as identified in FIG. 2 and FIG. 4, the baffled dip molds leave polar ribs in the form of concave grooves (20 and 40) and convex ridges (22 and 42), as artifacts of the baffled dip mold design. By their very design, conventional baffled dip molds approximate but never achieve penultimate bladders with truly round or other geometric shapes. In most cases, dip molded balloons for spherical inflated sportsball bladders are ribbed polygonal prolate or oblate spheroid shapes having bladder sphericity greater than 5%.

Using such conventional latex rubber dip molding and curing techniques, it is impossible to form a bladder having a substantially identical shape to that of the inner shell shape of a typical sportsball or gameball. In addition to the problems identified above, prior to removing the bladders from the mold, the bladders are essentially cured beyond the point at which they can be subsequently heat-set or re-molded. Because baffled dip molds are used and the bladders are cured to completion, conventional latex rubber bladders partially retain the shape and ribbed artifacts of the baffled dip mold upon inflation. For example, "spherical" bladders formed by conventional dip molding of latex rubber will produce bladders, having ridges or grooves effectively corresponding to the dip mold baffles. To date, there is no post curing or heat setting method for eliminating the partially retained shape of the baffled dip mold from conventional dip molded latex bladdrees.

Ideally, an inflated bladder should be perfectly shaped to match the shape of the intended article or sportsball. For example, a superior inner bladder for a sportsball, upon inflation, is ideally shaped substantially identically to the inner surface of the outer casing. Spherical sportsballs, like soccer balls, basketballs and volleyballs require spherical inner bladders. Oblong sport balls, like rugby and American gridiron footballs require prolate spheroid inner bladders. Pear shaped sport bags, like punching bags require pear shaped inner bladders.

Processes to manufacture bladders having desired geometric shapes are known. Most commonly, these bladders are made by a dry rubber inflation molding and curing process. This process produces a finished bladder that takes on the shape of the mold, for example, a sphere for a basketball, or a prolate spheroid shape for a rugby ball. The process uses dry millable rubber compounds such as natural rubber, EPDM, polyurethane and butyl rubber that are compounded with carbon black, sulfur, curatives and processing aids in conventional rubber mill or banbury mixer. Once fully combined, the resulting rubber or "green rubber", being highly malleable, is calendered to the desired thickness in sheet form. The resulting green rubber sheet is folded over itself in quarter sections, and die cut to form the desired shape. For a spherical shape, the green rubber is die cut to form a cube-like balloon as illustrated in FIG. 6. A valve house (60) is adhered to one equatorial end. The green rubber bladder (71) construction is fitted with a curing inflation needle (72) and is then inserted into a split hollow heated and air pressurized mold (73) depicted in FIG. 7. While inside the heated mold, the uncured balloon is inflated so that the heated green rubber stretches and expands against the interior mold surface, thereby curing the balloon into a fully formed dry rubber inflation molded bladder. Upon a full cure, the mold is separated so that the fully cured and ideally shaped bladder (80) can be removed from the mold as illustrated in FIG. 8. The penultimate bladder from this method is a geometrical sphere with zero bladder sphericity.

Bladders made by this dry rubber inflation molding and curing process comprise a variety of natural and synthetic rubber materials, the majority of which are natural rubber or butyl rubber or laminates, mixtures, alloys or blends thereof. These bladders are known to have superior shape retention. Many synthetic rubbers and alloys of butyl rubber tend to have improved air retention but still, they tend to be comparatively deficient in rebound and playability characteristics.

Inflatable sportsballs can be produced by several different processes. A large number of high quality inflated sportsballs comprise latex dipped rubber inner bladders contained within a hand-stitched laminated synthetic casing, particularly soccer balls, rugby balls and punching bags. Many other inflated sportsballs of varying quality comprise latex dipped rubber inner bladders contained within a thermal bonded laminated synthetic casing construction, particularly soccer balls and volleyballs. Many other of the lower quality inflated sportsballs comprise latex dipped rubber inner bladders contained within a machine-stitched laminated synthetic casing. The machine stitching process has practical limits for the thickness of the laminated synthetic casing, and so, lighter weight and thinner casing materials are necessitated. In sportsballs for kicking games where heavier outer casings are preferred, like soccer, rugby and gridiron football, the quality of light-casing, machine-stitched balls is correspondingly limited. Accordingly, machine-stitched sportsballs with latex dipped bladders are not practical because they will lose their shape retention after being kicked hard a couple of times.

Many of the lower quality inflated sportsballs comprise dry rubber molded rubber inner bladders contained within a machine-stitched laminated synthetic casing. For these sportsballs, there are several methods to address the inherent issues with shape retention. A very thick rubber bladder can be used. Alternatively, windings or cloth layers forming a spherical shell can be situated between the molded inner bladder and the outer casing material. In both of these cases, the inflatable sportsball's shape retention is improved. However, as described above, the rebound, moisture resistance and play characteristics of dry rubber molded bladders are deficient. The use of latex dip molded bladders is impractical because the penultimate bladders are not molded to the correct shape.

Moreover, conventional latex dip molded inner bladders are not ideal as sportsball bladders because the penultimate shape of the inflated but un-stretched inner bladders do not conform to a geometric shape or substantially shaped like the ultimate sportsball. The following table summarizes the state-of-the-art.

| Ball Manufacturing Method | Conventional Latex Dip Molded and Cured Bladders | Conventional Dry Rubber Inflation Mold Cured Bladders |
| --- | --- | --- |
| Hand-stitched Casings | State of-the-art | State of-the-art |
| Machine-stitched Casings w/fiber windings | Not Feasible (High Bladder Sphericity) | State of-the-art |
| Machine-stitched Casings w/floating covers | Not Feasible (High Bladder Sphericityl) | State of-the-art |
| Polyurethane Laminate Cover w/fiber windings | Not Feasible (High Bladder Sphericity) | State of-the-art |
| Rubber Carcass and Cover w/fiber windings | Not Feasible (High Bladder Sphericity) | State of-the-art |
| Thermal Bonded Casings | Feasible - Not Preferred (Oversized Bladders Only) | State-of-the-art Not Preferred |

Hence, there is a need for finished latex bladders and finished articles, e.g. sportsballs, which exhibit superior rebound coupled with persistent geometrical shape retention and superior air retention. Prior to the present invention, these three attributes could not be achieved with a single rubber latex dip molded bladder shell nor could it be achieved with a single dry rubber inflation molded bladder shell.

SUMMARY OF THE INVENTION

The present invention relates to an inflatable sportsball bladder comprising; neoprene latex, wherein upon inflation to a penultimate state, the bladder has a geometric spherical or polygonal spheroid shape having less than 2% bladder sphericity.

The present invention also relates to an inflatable sportsball bladder comprising neoprene latex, wherein upon inflation to a penultimate state, the bladder has a penultimate geometric prolate spheroid shape having less than 5% variation in its polar radius and less than 5% deviation in equatorial radius.

The present invention further relates to a method of manufacturing an inflatable neoprene bladder having a geometric shape comprising the steps of: a) selecting a baffled dip mold design having a surface volume, a polar perimeter and a equatorial perimeter, wherein the surface volume of the mold correlates to an inflatable bladder having a designed geometric shape; b) inserting the baffled dip mold into a neoprene latex bath to form a neoprene latex balloon; c) curing the neoprene latex balloon to no more than 98% cure; d) stripping the neoprene latex balloon from the mold; and e) post curing the balloon.

DETAILED DESCRIPTION OF THE INVENTION

Figure 1:
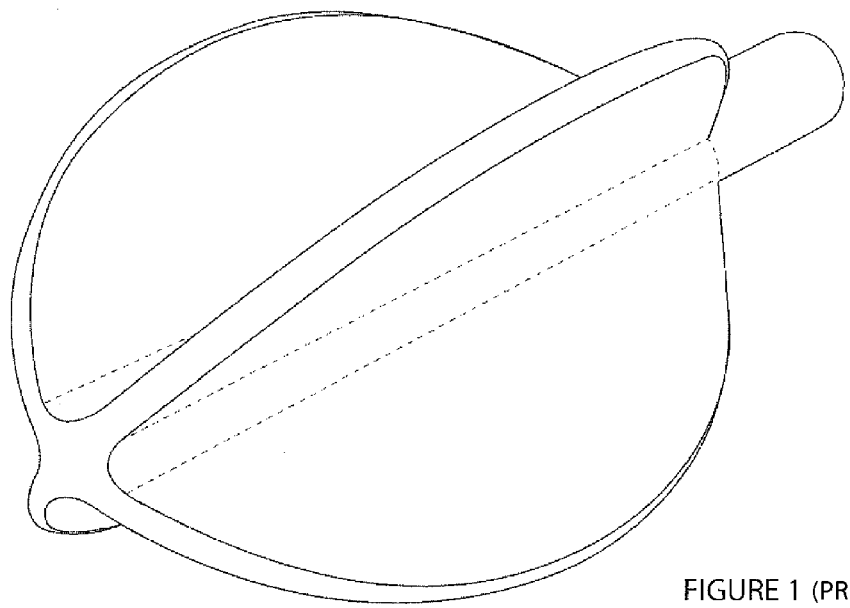
FIG. 1 shows an example of a conventional baffled dip mold with four (4) baffles.
Figure 2:
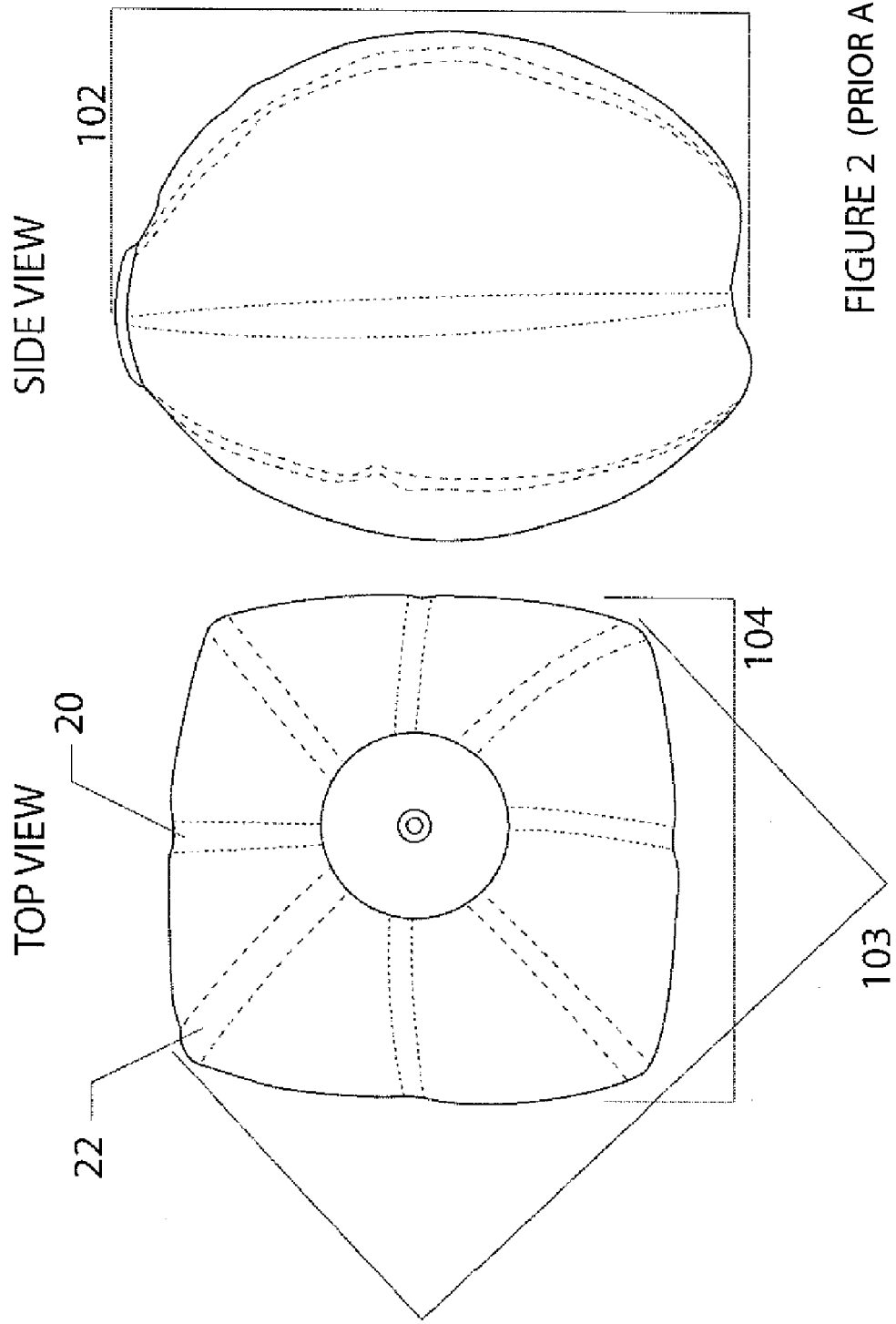
FIG. 2 shows an example of a ribbed polygonal prolate spheroid (olive) shaped bladder having ridges (22) and valleys (20) and exhibiting more than 10% sphericity produced by conventional dip molding processes using the dip mold of FIG. 1.

The present invention is directed to neoprene latex dipped bladders, and methods of manufacturing same. These bladders are useful for all known inflated articles, including sportsballs. More particularly, the present invention is directed to inflatable neoprene bladders useful in sportsballs or gameballs, such as soccer footballs, basketballs, volleyballs, gridiron footballs, rugby balls and punching bags. The bladders, and article, sportsballs or gameballs containing these bladders, exhibit high bounce and rebound properties, improved air pressure retention and superior feel and playability.

The term "neoprene latex" as used herein means liquid emulsion or aqueous dispersion of polychloroprene rubber, i.e. 2-chloro-butadiene-1,3.

The term "balloon" as used herein means a dip molded article having a neck at the proximal end which has not yet been formed into a finished bladder nor inflated.

The term "bladder" as used herein means an inflatable rubber sportsball inner liner comprising a balloon closed on one pole with a valve house and an inflation valve The term "penultimate state" as used herein describes the state of a fully cured balloon or bladder that is inflated with at least 0.5 psig air.

The term "inflation" or "inflated" as used herein means confining a compressed gas inside, specifically as applied to a bladder, or a sportsball, gameball or article comprising a bladder. The article confines a gas at a pressure sufficient to allow the bladder, or a sportsball, gameball or article comprising a bladder, to function for its end use. For example, the term refers to a soccer ball comprising a bladder where in the soccerball contains air at a pressure corresponding to specifications of the soccer ball suggested or required for its use in play.

The term "geometric shape" as used herein means any shape or form that is mathematical in origin or having a distinct and characteristic shape. Geometric shapes include, but are not limited to spheres, pears, prolate spheroids, polygonal spheroids and other polygonal shapes.

The term "polar" as used herein means the bisecting plane of a bladder defined by a perpendicular axis extending though the valve of an inflated but unstretched bladder.

The term "equatorial" as used herein means the bisecting plane tangent to polar.

The term "polar perimeter" as used herein means the length of the arc mapped by the penultimate bladders polar radius, with or without eccentricity.

The term "equatorial perimeter" as used herein means the length of the arc mapped by the inflated but unstretched bladders equatorial radius with or without eccentricity.

The term "bladder sphericity" as used herein refers to a measure of the maximum deviation from the average bladder diameter defined by the apparent diameters in the bisecting polar and equatorial planes. The bladder is inflated to 0.5 psig. The maximum equatorial width, the minimum equatorial width and the maximum polar height are measured in millimeters. The arithmetic range is divided by the average providing a result expressed as a percentage.

The term "rebound" as used herein refers to the average elevation of an article's first and second bounces from being dropped from an initial elevation of 72 inches onto a concrete floor.

The term "air retention" as used herein refers to the steady-state rate, expressed in hours per cubic centimeter, for air to permeate an inflated sportsball bladder sample when a 1.76 square inch area is exposed to a 50 psig air pressure gradient at room temperature.

The inflatable neoprene bladders of the present invention can be manufactured to form penultimate bladders with geometric shapes consistent with the shape of the desired article or sportsball.

Preferably, the penultimate shape of the bladders of the present invention are substantially identical to the shape of the desired article or sportsball. Moreover, unlike conventional dip molded bladders, these bladders essentially have a continuous and uniform surface or shape. The bladders of the present invention are substantially free of ridges, and/or convex and concave valleys corresponding to the dip mold baffles.

Neoprene latex bladders are not ubiquitously commercialized. One reason is that, historically, neoprene has been more expensive than other latex rubbers. Another reason is that neoprene latex exhibits lower tear strength than natural latex and so it is more difficult to strip from dip molds. Finally, because conventional latex dip molded bladders do not yield geometrically shaped bladders, they are not suitable for the majority of sports ball manufacturing methods, including machine stitching and laminated ball manufacturing.

In one embodiment, the present invention is directed to an inflatable bladder comprising neoprene, wherein the bladder has a geometric shape, and wherein the bladder exhibits substantially similar rebound performance as compared to a neoprene bladder manufactured by latex rubber dip molding. The bladder of the present invention also exhibits substantially similar cold temperature rebound performance as compared to a neoprene bladder manufactured by latex rubber dip molding. Finally, the bladder of the present invention exhibits substantially similar air retention performance as compared to a neoprene bladder manufactured by latex rubber dip molding.

In another embodiment, the present invention relates to a method of manufacturing a neoprene inflatable bladder comprising the steps of selecting a baffled dip mold having a surface area, a polar perimeter and a equatorial perimeter, wherein the surface shape of the mold correlates to an inflatable bladder having a geometric shape; dip molding and curing a neoprene latex balloon using the mold, wherein the balloon is cured to not more than about 98%, stripping the neoprene latex balloon from the mold; and post curing and/or heat setting the balloon using an inflated dry rubber bladder mold to form the neoprene inflatable bladder having a geometric shape.

Baffled Dip Mold Formers

A "baffled dip mold former" is also referred to herein as a "baffled dip mold", a "dip mold", a "mold", a "former", a "mold former", and a "dip mold former".

In preparing the inventive bladder, it is preferred that a first step is to design a baffled dip mold that produces the inventive bladder. A desired design of the mold is a shape that produces a balloon that closely approximates the inner shell of the end use article or sportsball in which it will be used. Such desired design is achieved by defining the polar and equatorial perimeters, of the baffles of the mold former, For instance, to form a sphere, the polar and equatorial perimeters of the baffles will be equal.

Figure 3:
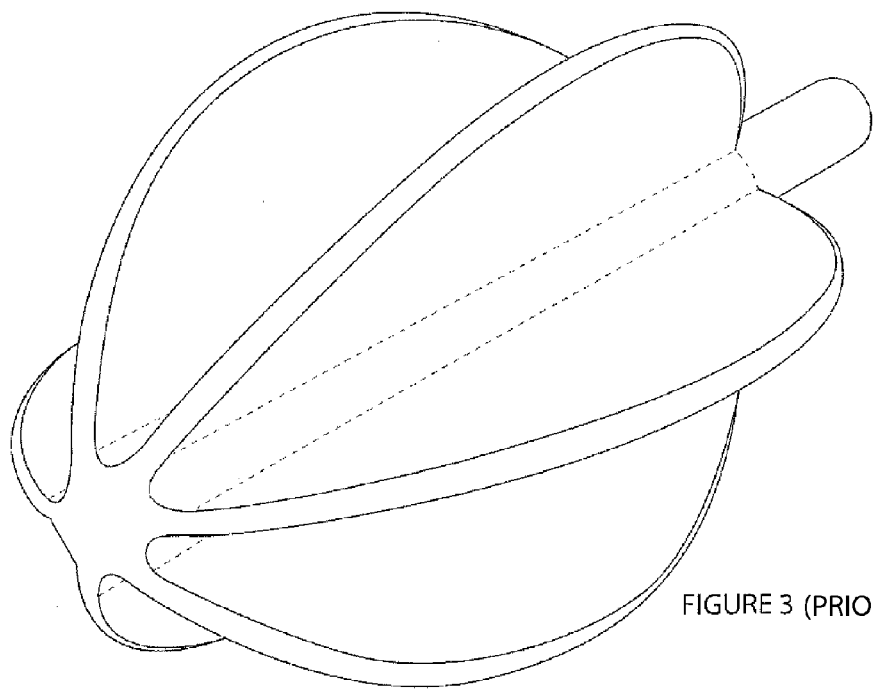
FIG. 3 shows an example of a conventional baffled dip mold with six (6) baffles.
Figure 4:
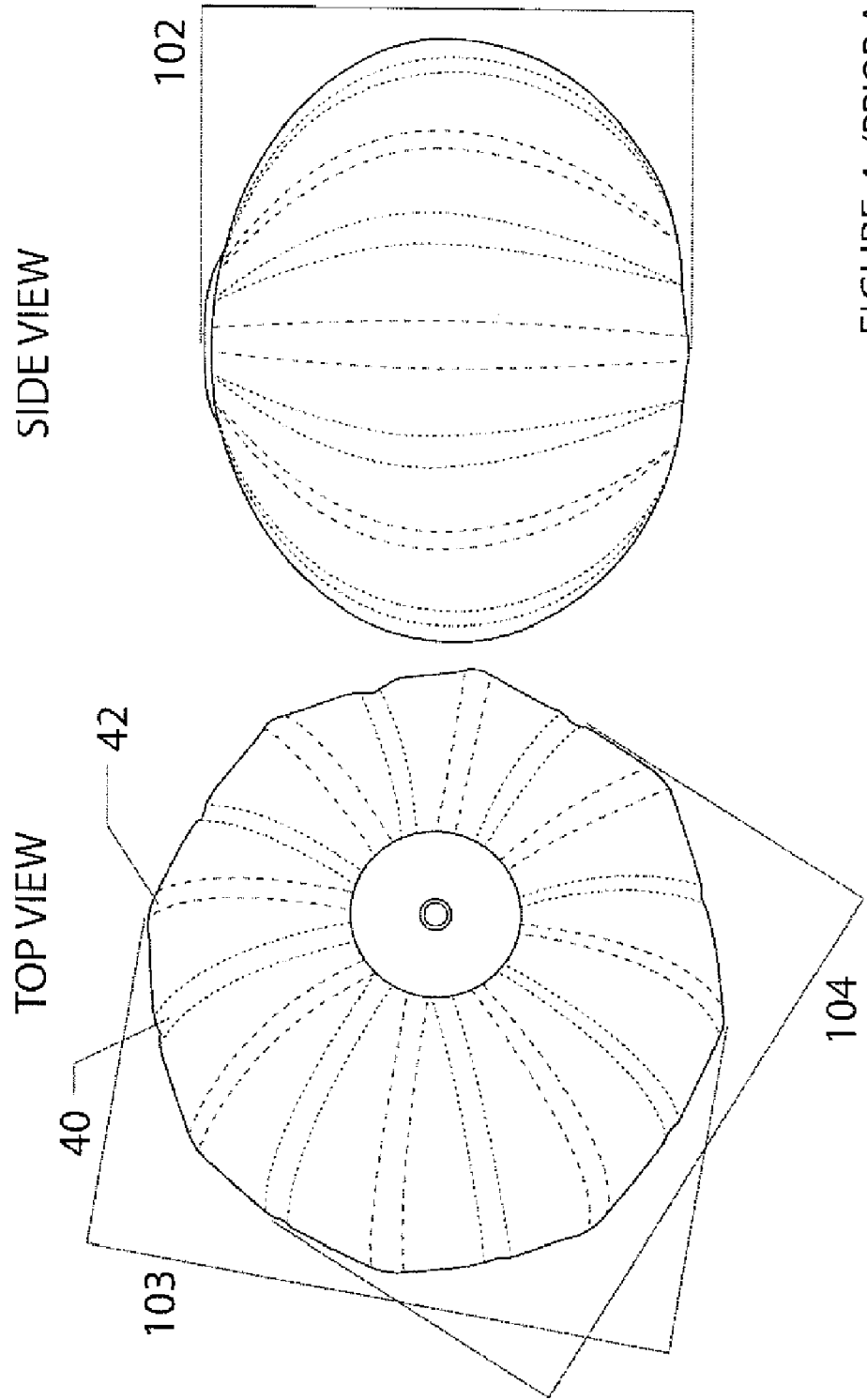
FIG. 4 shows an example of a ribbed polygonal oblate spheroid (pumpkin) shaped bladder having ridges (42) and valleys (40) and exhibiting more than 15% sphericity produced by conventional dip molding processes using a baffled dip mold with eight (8) baffles.
Figure 5:
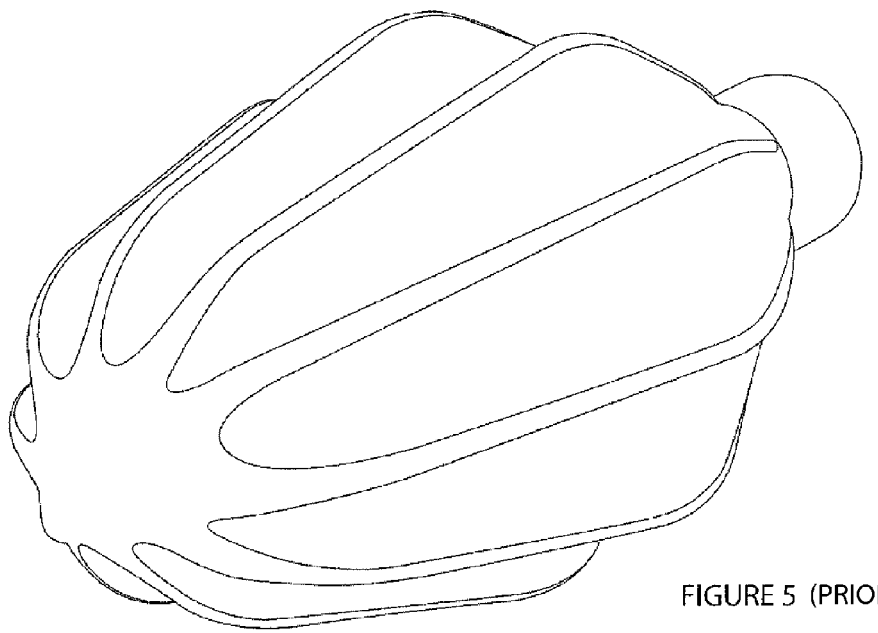
FIG. 5 shows an example of a conventional baffled dip mold with ten (10) baffles.
Figure 6:
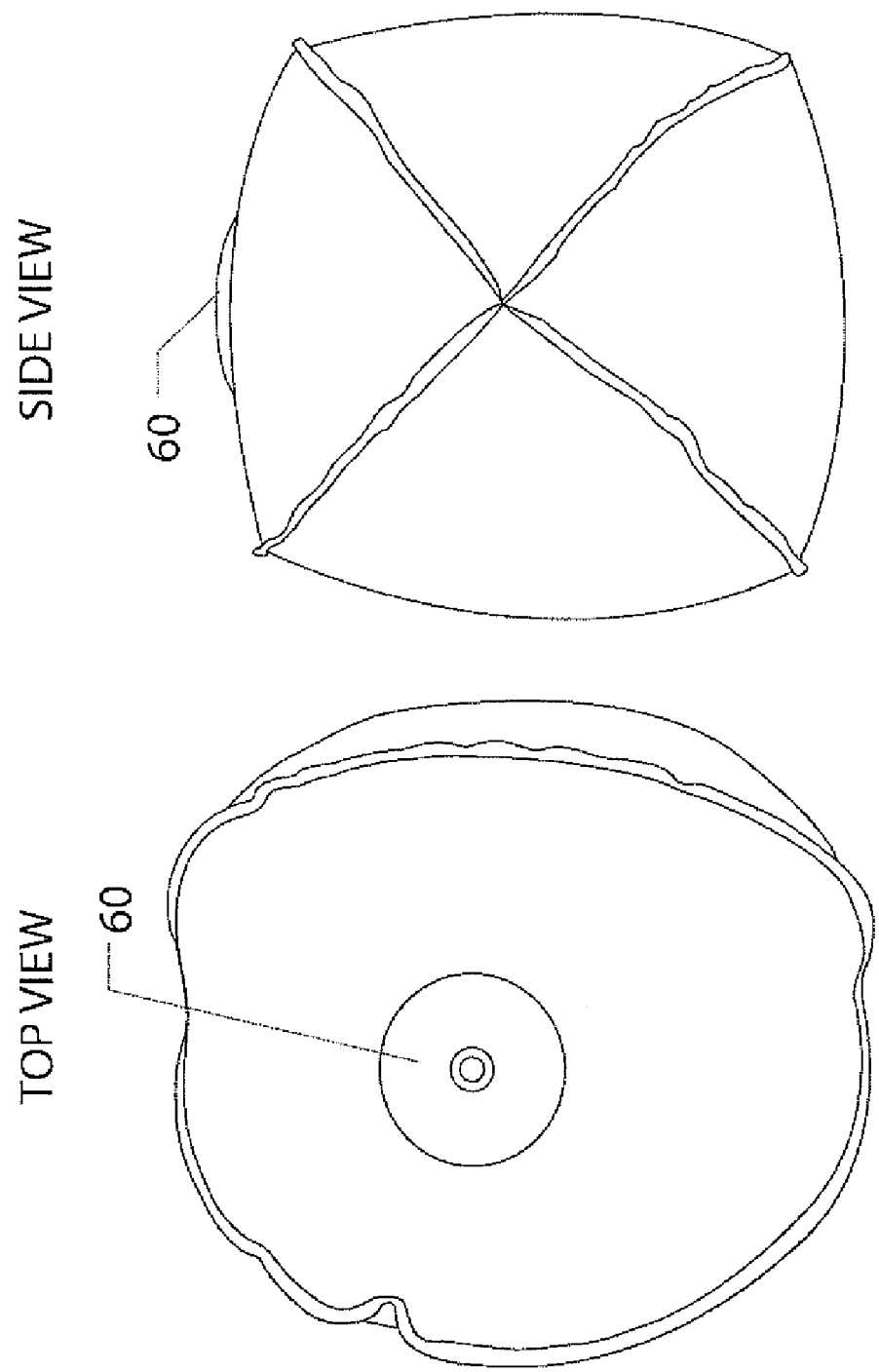
FIG. 6 shows an example of a green rubber square balloon used in conventional dry rubber inflation molding.
Figure 7:
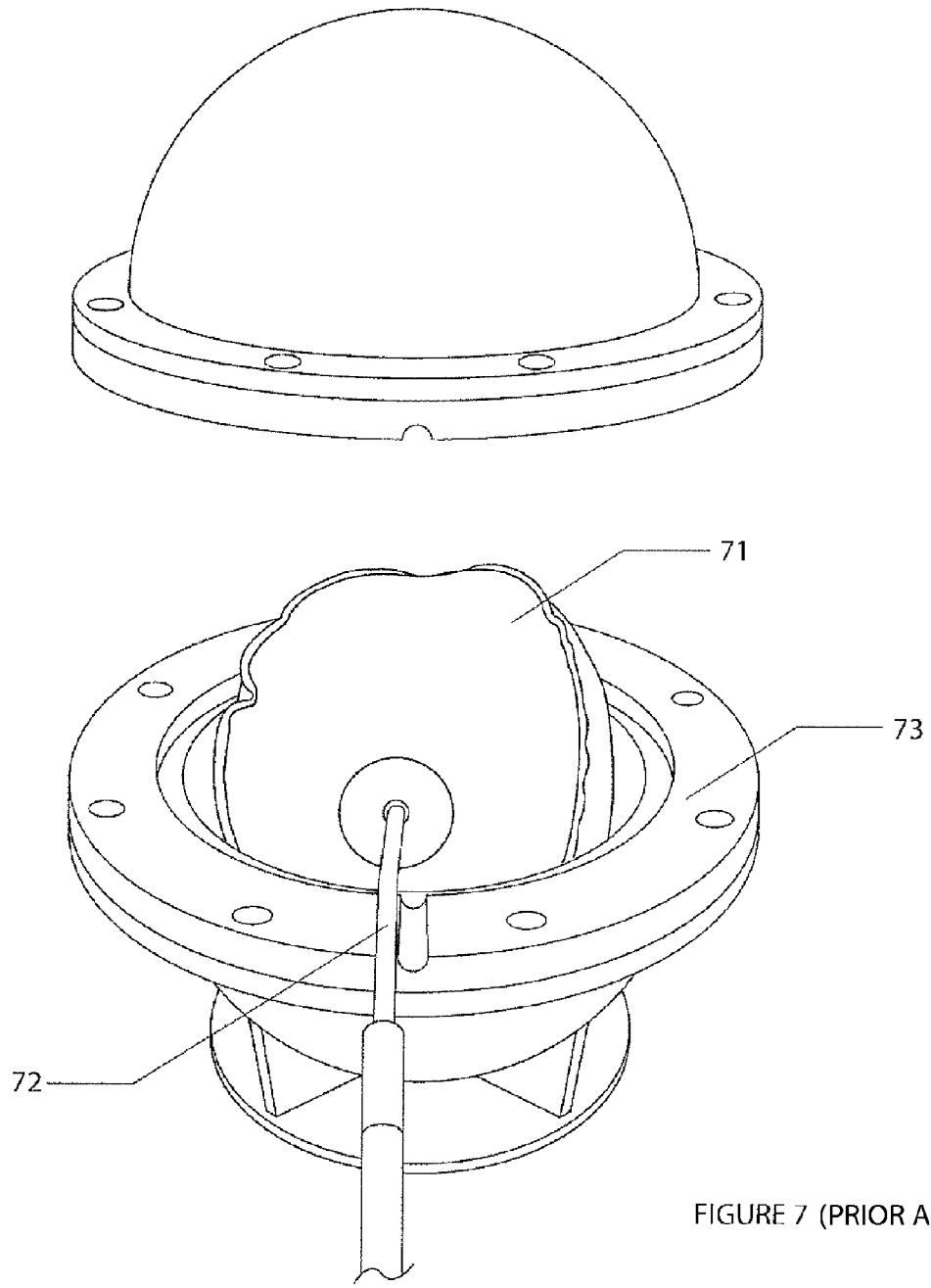
FIG. 7 shows an example of a conventional dry rubber inflation mold apparatus and a green rubber square balloon prior to bladder cure.
Figure 8:
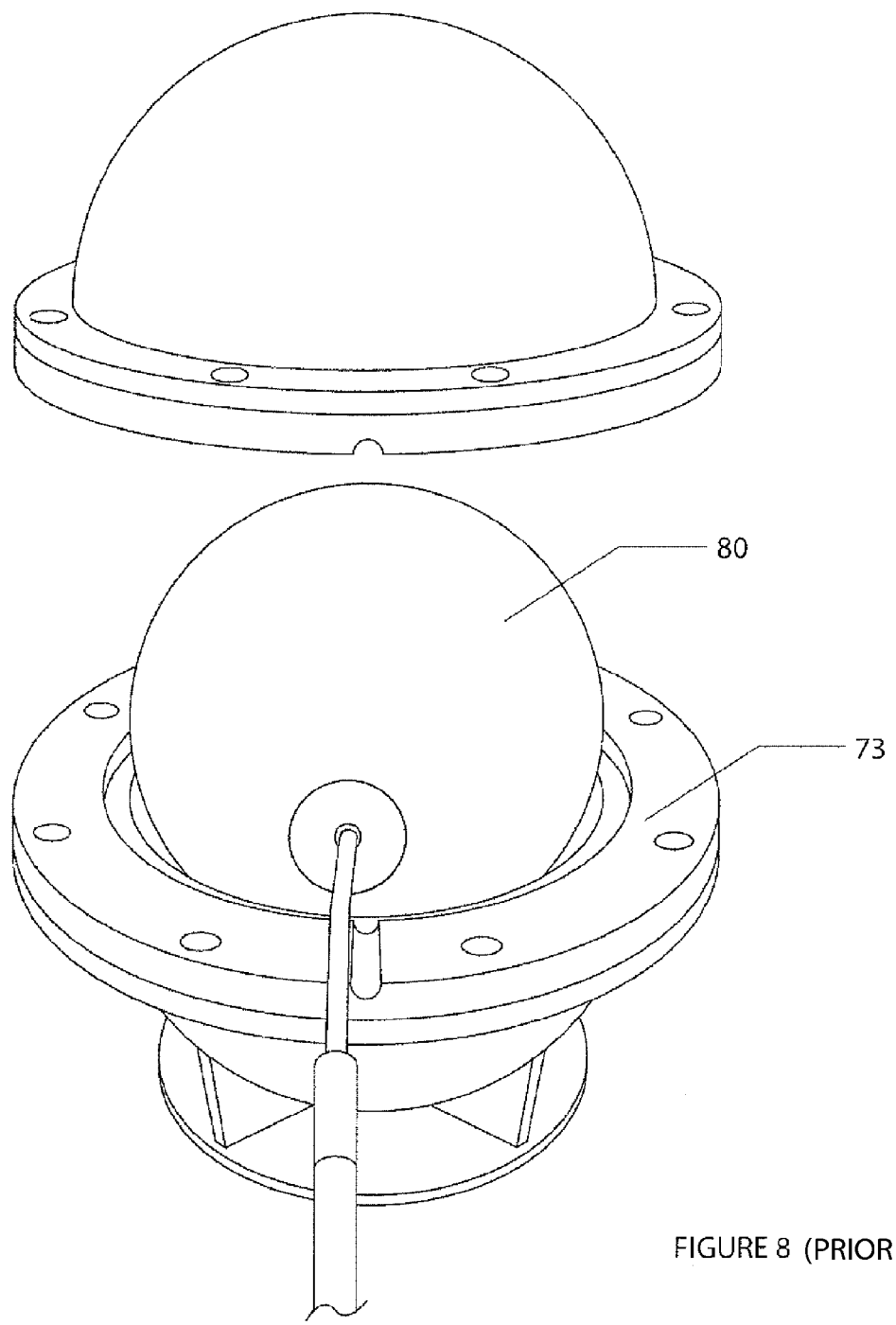
FIG. 8 shows an example of a geometrical spherical cured bladder having zero bladder sphericity resulting from a conventional dry rubber inflation molding process.
Figure 9:
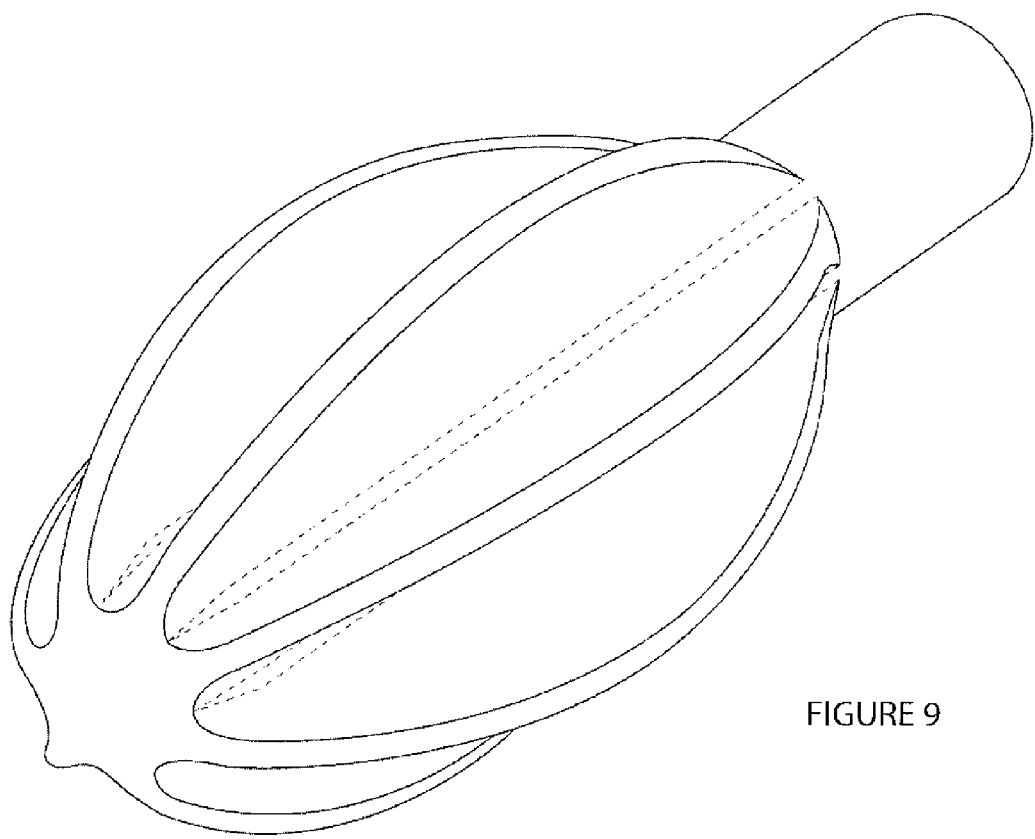
FIG. 9 shows an example of an improved baffled dip mold with seven (7) baffles.
Figure 10:
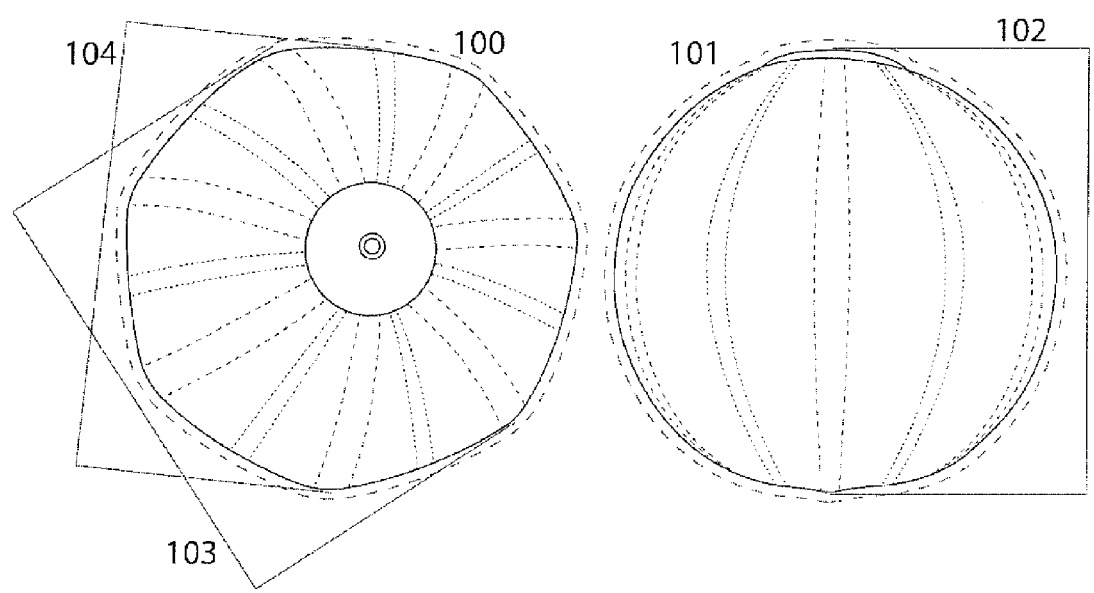
FIG. 10 shows an example of a heptagonal spheroid dip molded bladder resulting from the mold of FIG. 9 which provides a bladder having less than 2% bladder sphericity and nearly equal polar and equatorial perimeters.

FIGS. 1, 3, and 5 show examples of state-of-the-art baffled dip mold formers that have non-equal polar and equatorial perimeters none of which are preferred in the present invention. FIG. 9 shows an example of a seven (7) baffled dip mold former having equal polar and equatorial perimeters. FIG. 10 shows an example of the resulting heptagonal spheroid dip molded bladder formed from the dip mold in FIG. 9 having equatorial perimeter (100), polar perimeter (101) maximum polar height (102), maximum equatorial width (103) and minimum equatorial width (104) with less than 2% sphericity and nearly equal polar and equatorial perimeters.

Figure 11:
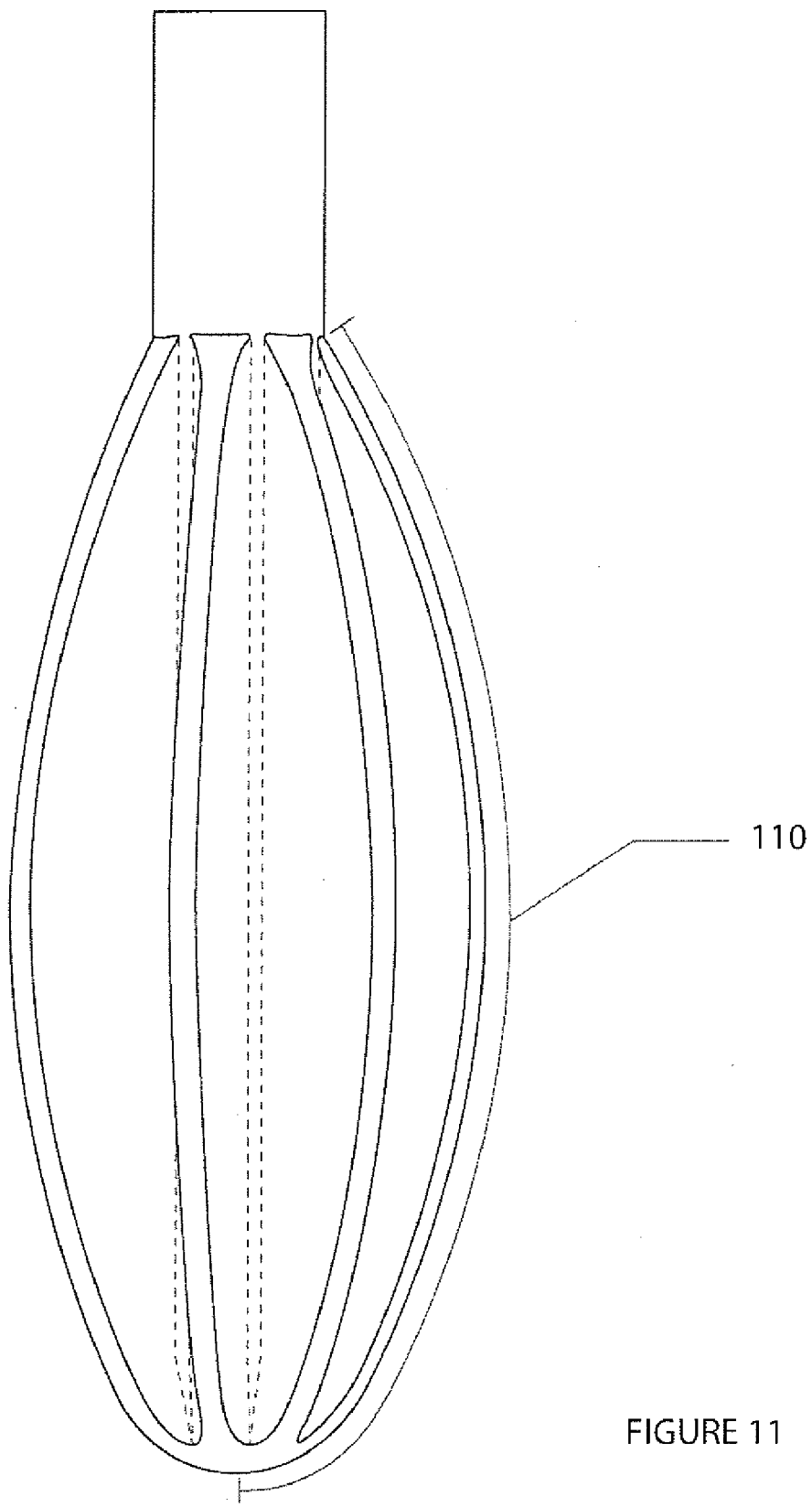
FIG. 11 shows an example of the polar perimeter measurements for the improved baffled dip mold of FIG. 9. Only half of the perimeter is identified in this illustration because of the perspective of the diagram. Since the mold has an odd number of baffles it is only possible to accurately illustrate half of the actual arc here. The polar perimeter is twice the arc noted as (110).
Figure 12:
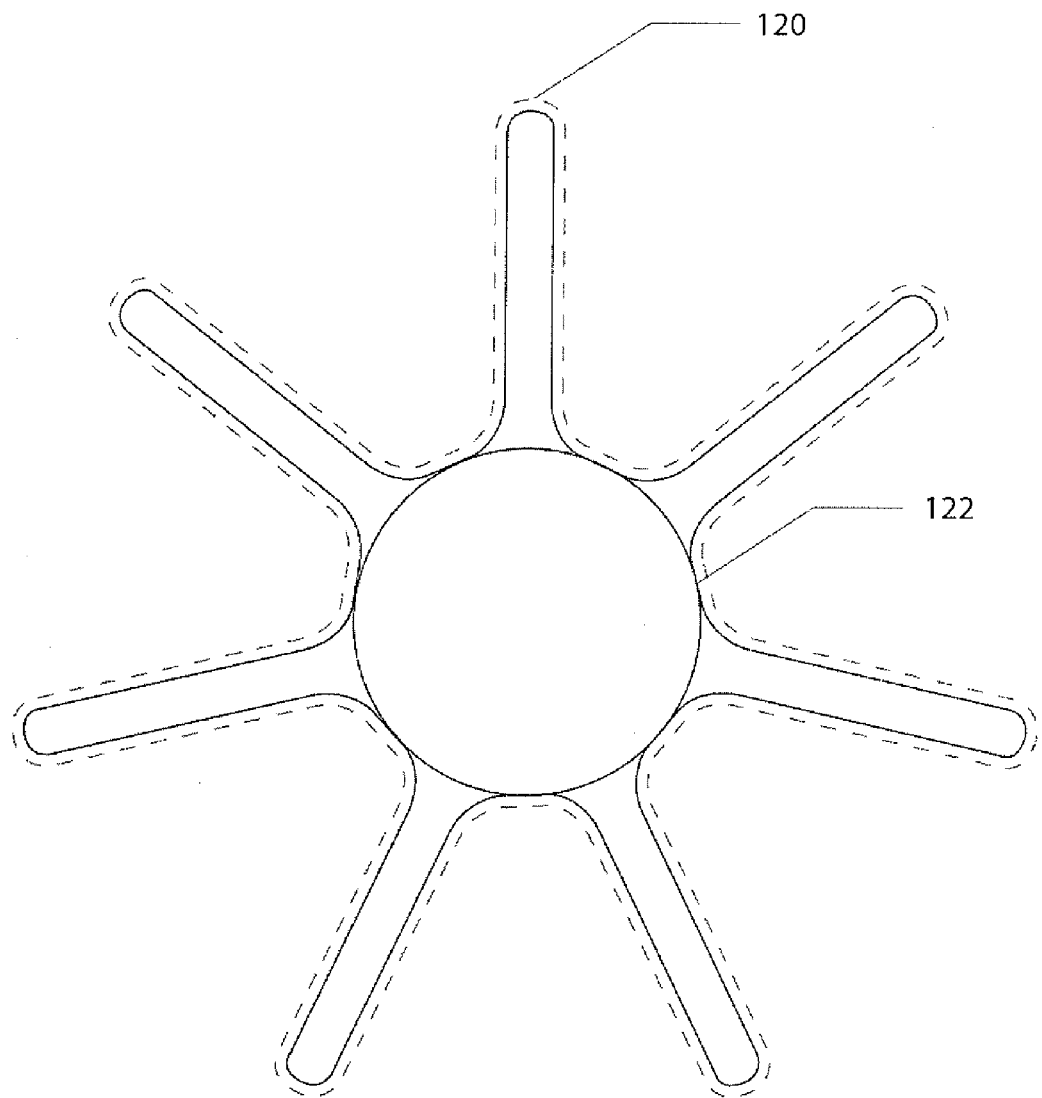
FIG. 12 shows an example of the equatorial perimeter (120) and neck diameter (122) measurements for the improved baffled dip mold of FIG. 9.

FIGS. 11 and 12 are alternative views of the mold in FIG. 9 which illustrate the polar perimeter (110), equatorial perimeter (120), and proximal neck opening (122). Preferably, the geometric perimeter of a bladder in the penultimate state made herefrom is equal to or slightly smaller than the geometrical perimeter of the dry rubber bladder mold. Set forth below for exemplary purposes, are preferred polar and equatorial perimeter lengths for baffled molds designed to form the inventive bladder for conventional soccer footballs.

| Soccer Ball size | Dip Mold Former - Equal Polar and Equatorial Perimeter size ranges |
| --- | --- |
| 2 | 440-445 mm |
| 3 | 529-534 mm |
| 4 | 579-584 mm |
| 5 | 611-616 mm |

For prolate spheroid bladders, the baffled dip mold former may be designed to provide a penultimate balloon having non-equal polar and equatorial perimeters. Those having skill in the art can adjust polar and equatorial perimeters of mold baffles to achieve desired shape (e.g. prolate, pear, etc.). For example, the baffled dip mold former may form prolate spheroid bladders shaped like American gridiron footballs. The prolate spheroid bladders shaped like American gridiron footballs may be described by the ratio of polar to equatorial perimeter. The baffled dip mold formers of the present invention may form prolate spheroid bladders shaped like American gridiron footballs in many different sizes. A common size is NFL and NCAA standard which requires footballs to have polar perimeters ranging from 527-540 mm and equatorial perimeters ranging from 705-724. Accordingly, the preferred ratio of polar to equatorial perimeter is about 1.2 to about 1.5. More preferably, the ratio of polar to equatorial perimeter is about 1.25 to about 1.4. Most preferably, the ratio of polar to equatorial perimeter is about 1.30 to about 1.38.

Because neoprene latex is known to have lower tear strength than natural latex, a larger neck diameter is preferred. Preferably, the proximal neck opening ranges from about 30 mm to about 55 mm. Most preferred, the proximal neck opening is about 35 mm.

The dip mold former should preferably have at least 5 baffles. More preferably, the dip mold has between 6 and 8 baffles, and more preferably still, 7 baffles. The baffle dip mold may comprise plastic, metal, ceramic or combinations thereof. A preferred mold comprises aluminum.

Dip Molding

Dip molding may be used to prepare the bladders of the present invention. Baffled dip mold, as described above, which have been preconditioned by preheating and/or by a coagulant, may be used. For example, inflatable bladder shells may be manufactured using this method by dipping a cleaned dip mold former into first coagulant bath to obtain a uniform film on the former. The mold may be preheated, preferably to a temperature between 150 and 220° F. The coagulant bath may comprise components selected from calcium nitrate, calcium chloride, acetic acid, parting agents or carriers, water and optionally alcohol, wetting agents and defoaming agents. The former having a layer of coagulant on it is then dried. Preferably, after coating the mold is dried to form a tacky surface. The coagulant coated former may then be dipped into the tank comprising nitrile latex. Thereafter, the latex coated former may then be dried in an oven. The former may then be dipped into a water bath for cooling and thereafter the bladder shell may be stripped, washed, dried and subjected to post curing treatment. A valve house flange may then be adhered to the proximal neck of the bladder shell to form the bladder for the inflatable ball.

In a preferred embodiment, the baffled dip mold is dipped into neoprene latex bath. The neoprene latex bath comprises ingredients list in the table below.

| Ingredient | % | Grams | Description |
|---|---|---|---|
| Nitroblock ™ latex | 91.4 | 45.68 | 60% neoprene latex |
| 10% KOH | 2.8 | 1.42 | 10% KOH |
| Darvan WAQ | 0.6 | 0.28 | Darvan WAQ |
| Akrosperse W-9944 | 0.8 | 0.42 | Aq. Dispersion Sulfur (68%) |
| Akrosperse W-9750 | 1.1 | 0.57 | Zinc diethyldithiocarbamate |
| Akrosperse W-9989 | 0.9 | 0.47 | Aq. Dispersion ZnO (60%) |
| Akrosperse W-9924 | 1.1 | 0.57 | Antioxidant 12 |
| Akrosperse W-9753 | 1.2 | 0.59 | Aq. Dispersion Wax (48%) |

Nitroblock™ latex, is a preferred neoprene latex, a private label emulsion purchased from Killian Latex Inc. located in Akron, Ohio. The remaining ingredients are commercially available.

Optionally, the neoprene latex may also comprise any of those formulations described in Compounding Neoprene Liquid Dispersion for Colloidal Properties, by DuPont Performance Elastomers, NPE-H71939-00-F0406 and Neoprene Liquid Dispersion Dipped Goods, by DuPont Performance Elastomers, NPE-H73631-00-E0406, or in Basic Compounding of Neoprene Liquid Dispersion, by DuPont Performance Elastomers, the disclosures of which are incorporated herein by reference in their entirety.

The neoprene latex may also comprise micrometer-scale glass microspheres. The spheres are useful, in part, for lowering the density of the dip molded balloons. Preferably, the glass microspheres have surface active agents to facilitate ideal bonding between the neoprene polymeric rubber and the glass surface. For example, the glass microspheres may be H20/1000 (20 g/cc) grade microspheres from 3M, Inc. Preferably, the neoprene latex comprises between about 1 dry weight percent and about 25 dry weight percent glass microspheres. More preferably, the neoprene latex comprises between about 5 dry weight percent and about 13 dry weight percent glass microspheres. Most preferably, the neoprene latex comprises about 10 dry weight percent glass microspheres.

The neoprene latex may also comprise nanometer-scale particles. The nanometer-scale particles are useful for lowering the effective air permeability of dip molded balloons. Preferably, the nanometer-scale particles are an aqueous suspension of exfoliated clay particles such as the 2.5% weight solids variety of Cloisite Na+, sold by Southern Clay Products, Inc. Preferably, the neoprene latex comprises about 0.1 dry weight percent nanometer-scale particles. More preferably, the neoprene latex comprises about 0.25 dry weight percent and about 3 dry weight percent nanometer-scale particles. Most preferably, the neoprene latex comprises about 1 dry weight percent nanometer-scale particles.

The thickness of the neoprene latex layer on the baffled dip mold depends on the desired thickness of the bladder. Preferably, the thickness of the neoprene latex bladder ranges from about 0.5 mm to about 1.25 mm, and more preferably, from about 0.75 mm to about 1.0 mm. The thickness of the neoprene latex layer is also of function of dwell time in the dipping tank. Preferably, the baffled dip mold is dipped into the neoprene latex bath for a total period of about 1 to about 4 minutes, and more preferably, for a total period of about 2 to about 3 minutes. Optionally, the dwell time may vary as a function of the dip mold. For example, the entire mold may be dipped into the neoprene latex bath for a set time period. Thereafter, the mold is partially removed and a portion of mold remains in the bath. The dwell time for the section remaining the bath is longer than the section removed from the bath. The dwell times may vary in order to vary the weight or thickness of one portion of the balloon or bladder. Those having skill in the art are familiar with dwell times and achieving desired bladder thickness.

The mold may also be rotated while dipped into the neoprene latex bath and once removed from the bath. Rotation of the mold removed form the bath wherein the distal end points upward may be performed from between approximately 1 to 10 minutes, preferably 3 to 5 minutes, to allow the balloon to gel. Rinsing of the film and leaching may also be performed. Rinsing and/or leaching may last up to about 20 minutes.

Thereafter, the baffled dip mold is dried. Any conventional drying method known in the art may be used to dry the neoprene latex coated baffled dip mold. During the drying step, the neoprene is cured. Importantly, the neoprene balloon is removed from the baffled dip mold prior to the completion of curing. Preferably, the neoprene balloon removed from the baffled dip mold is less than about 98% cured. More preferably, the neoprene balloon removed from the baffled dip mold is less than about 97% cured. Most preferably, the neoprene balloon removed from the baffled dip mold is less than about 95% cured.

The "percent cured" amount for the neoprene balloon may be measured by the degree to which the film swells in a given solvent. The standard cure test is the measure of volume change after immersion in ASTM Oil No. 3 (an aromatic hydrocarbon) at 100° C. for a given period of time, e.g., 70 hr. The rate of cure can be determined by measuring the volume increase on samples that have experienced different heat histories.

Drying and curing time vary with temperature. For example, the drying and curing time may be between about 60 and about 120 minutes in an oven wherein the starting temperature is about 200° F. and is ramped up slowly to at least 230° F. Preferably, the drying and curing time is between about 70 and about 110 minutes. More preferably, the drying and curing time is between about 90 and about 100 minutes.

Stripping

After the neoprene is partially cured, the neoprene balloon is removed from the baffled dip mold. Any conventional stripping method known in the art may be used to strip the neoprene balloon from the dip mold former. For example, submersion in clean water or the use of a water stream may be used to assist stripping. Alternatively, use of a pressurized air stream may be used to assist stripping Closure After the neoprene balloon has been stripped from the dip mold former, a closure may be added. Preferably, the closure is added prior to the final curing of the neoprene balloon. Any conventional closure and method to add the closure known in the art may be used.

Figure 13:
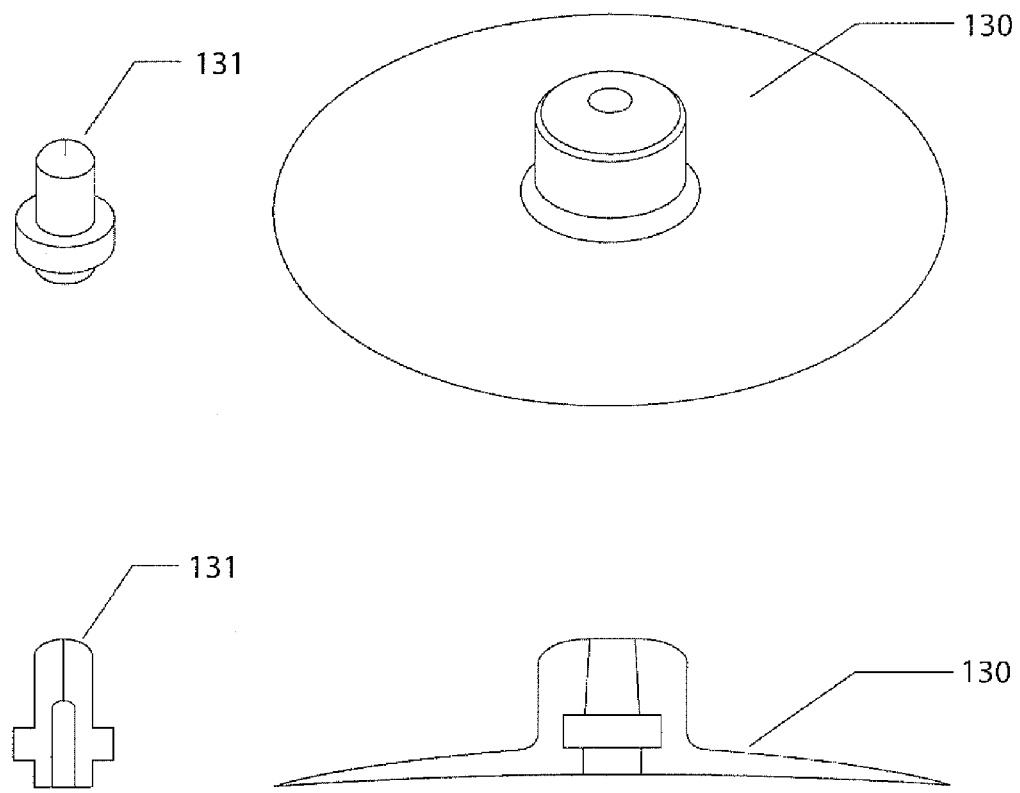
FIG. 13 shows an example of a valve house (130) and an inflation valve (131) that may be used with the neoprene latex bladders of the present invention.

A state-of-the-art valve house (i.e. closure) may be adapted with a much larger flange diameter to accommodate the larger neoprene latex balloon. FIG. 13 shows a valve house (130) having such a large flange. The diameter of the valve house flange may be increased from about 40 mm to about 75 mm, preferably between about 70 mm and about 80 mm. This valve house flange may be adhered to the latex balloon with a rubber cement like the one sold by Ashland Chemical under the trade name Pliobond 20 or chloroprene graft adhesive sold by Dongsung NSC (Thailand) Co., Ltd. After application of the solvent based contact adhesives, the solvent is preferably dried prior to joining the surfaces. Preferably, drying occurs in an about 50° C. to about 75° C. environment and lasts for about 2 minutes to about 10 minutes. More preferably, drying occurs in a 65° C. environment and lasts for about 5 minutes.

The present invention has application in dip molded inflatable rubber articles with narrow closures, including inner bladders for inflated sports balls, inner bladder baffles for other devices such as for inflated bedding, marine floatation device applications, and inner tubes for bicycle and motorcycle tires.

Post-Cure

The neoprene bladder must be post-cured and optionally heat-set to a geometrical shape. Preferably, the heat-set step uses an inflated dry rubber bladder mold.

Figure 14:
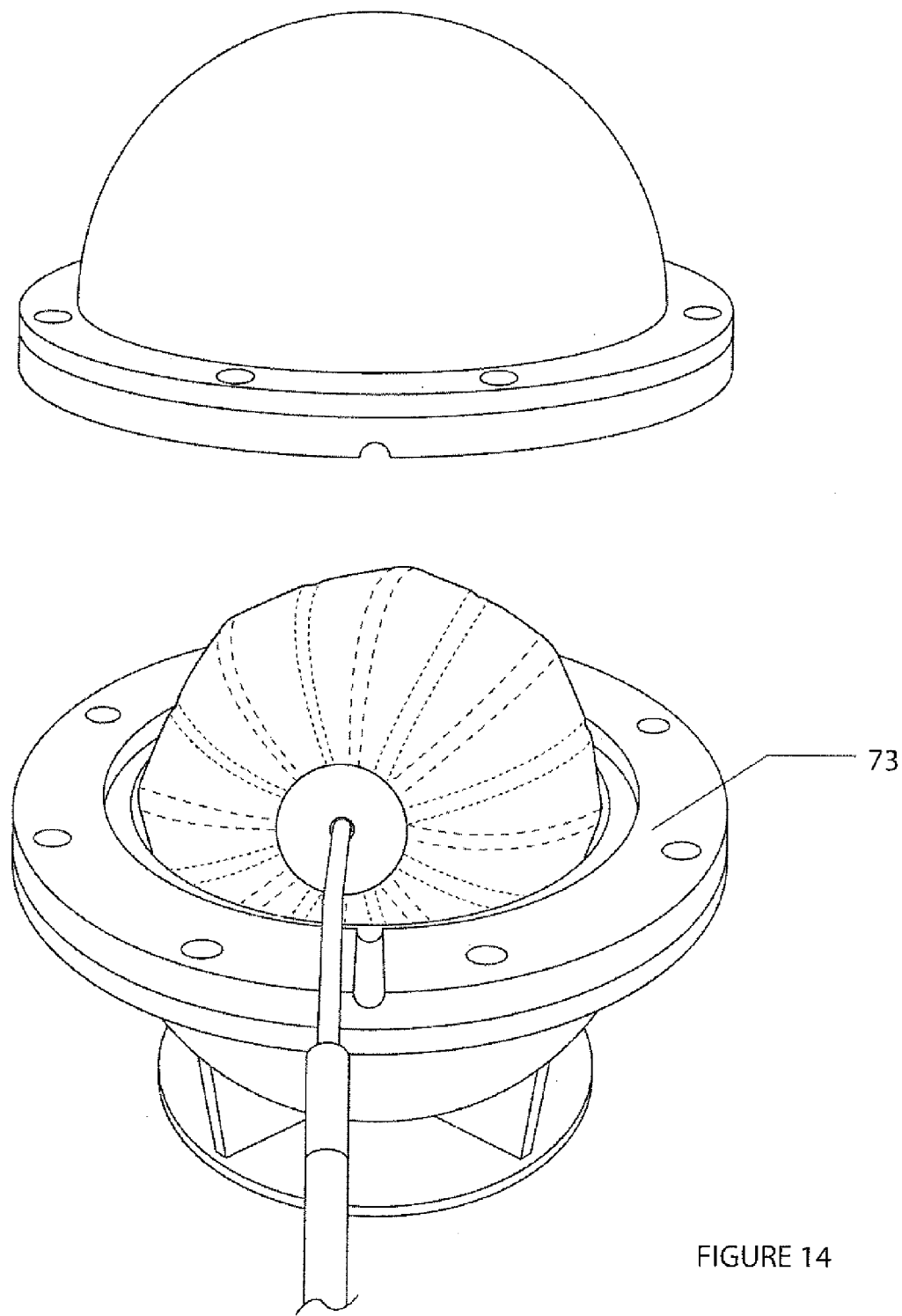
FIG. 14 shows an incompletely cured bladder of FIG. 10 with less than 2% bladder sphericity being second-cured and heat-set within a dry rubber inflated bladder mold. After being heat-set, this bladder becomes ideally spherical having zero bladder sphericity.

In one embodiment, the post-curing and heat-set is accomplished by tabing an incompletely cured neoprene balloon/bladder that has been stripped from the dip mold (hereafter "bladder") and affixing with a valve house and then is second-cured within a dry rubber inflated bladder mold as illustrated by FIG. 14. FIG. 14 shows an incompletely cured heptagonal spheroid dip molded neoprene bladder to be post-cured and heat-set within a dry rubber inflated bladder mold. The resulting penultimate bladder ideally takes on the shape of rubber inflated bladder mold. In order to achieve such desired shape, the penultimate bladder is inflated slightly and inserted into the opened bladder mold. After the mold is closed, the bladder is inflated so as to push the bladder against the inner surface of the mold. Preferably, the bladder is inflated within 1 minute after the mold is closed. More preferably, the bladder is inflated within 15 seconds after the mold is closed. Most preferably, the bladder in inflated immediately after the mold is closed. In this mold, the neoprene bladder is cured to completion. Preferably, the mold is either electrically or steam heated to between about 125° C. and about 150° C. More preferably, the mold is heated to about 140° C. Preferably, the cure inflation pressure is between about 5 kg/cm$^2$ and 10 kg/cm$^2$. More preferably, the cure pressure is about 7 kg/cm$^2$. Preferably, the cure time is between about 1 minute and about 5 minutes, and more preferably, about 2 minutes. Such post-curing of a balloon dip molded from the former in FIG. 9 provides a penultimate bladder which is useful in machine-stitched volleyballs, thermal bonded volleyballs or in size 4 machine-stitched soccer balls or size 4 or size 5 hand-stitched soccer ball bladders or size 5 thermal bonded soccer ball bladders.

A thin high barrier coating may be applied to the inside of the balloon surface. The barrier coating is useful to further improve air retention. For example, prior to dip molding into the neoprene latex bath, the baffled dip mold is dipped into a barrier filled latex suspension. Ultimately, this forms a thin high barrier coating on the inside of the balloon/bladder surface.

The barrier may comprise suspensions of exfoliated vermiculite in neoprene latex rubber as described in Elastomeric Barrier Coatings for Sporting Goods published by InMat LLC. Preferably, the thickness of the wet film barrier film may be between about 250 to about 500 microns thick. More preferably, the film thickness is about 300 to about 400 microns. Upon drying, the barrier thickness becomes about 10 to about 30 micrometers thick. This coating may then be overdipped with neoprene latex in order to build the bulk of the bladder thickness, which when dried may range between about 0.5 and about 1.0 millimeters thick. More preferably, the dried thickness is about 0.65 to about 0.8 millimeters thick. Most preferably, the dried thickness is about 0.75 millimeters thick. See Example 18 for an example of a bladder prepared with an additional barrier.

A layer of polyvinyl alcohol may be coated on the interior surface of the bladder. For example, after the closure is joined, an injection needle may be inserted through the inflation valve house to dispense an aqueous coating solution of polyvinyl alcohol. The polyvinyl coating is useful to improve the air barrier properties of the inflated neoprene latex bladder. Once injected, the liquid may be spread out about the interior surface of the bladder by hand mastication.

A balance patch may be adhered to the balloon opposite the closure. The patch may be adhered to the inside, outside or both sides of the balloon/bladder. Preferably, the patch is adhered to the balloon after the balloon has been stripped from the dip mold former, but prior to post-curing the balloon. The balance patch is useful for counterbalancing the ball in regards to the closure. The patch is also useful for making stuffed bladders suitable for football soccer balls.

The patch may comprise a dry rubber molded disk or a latex dip molded disk having approximately the same thickness as the bladder and a diameter adequate to form a reliable seal around the proximal balloon neck opening. The diameter of the patch should provide for at least about 10 mm of additional diameter if it is to be used to seal the proximal balloon neck opening.

Optionally, an acoustical pad or pads may be adhered to the interior of the balloon/bladder. The pad(s) may be adhered to the inside, outside or both sides of the balloon/bladder. Preferably, the pad(s) is adhered to the balloon after the balloon has been stripped from the dip mold former, but prior to post-curing the balloon. The pads are useful for sound attenuation. For example, the after balloon is stripped it may be turned inside out and foam pad(s) may be adhered to the inside of the balloon. Chloroprene graft adhesive contact cement, as those sold by Dongsung NSC (Thailand) Co., Ltd may be applied to one side of the foam pad and to the inner surface of the neoprene latex dipped balloon. After application of the solvent based contact adhesives, the solvent is preferably dried prior to joining the surfaces. Preferably, drying occurs in an about 50 C to about 75 C environment and lasts for about 2 to about 10 minutes. More preferably, drying occurs in a 65 C environment and lasts for about 5 minutes. The two surfaces may be joined by contact and hand pressure. Thereafter, the balloon may be turned outside in and the manufacturing process continued to a finished bladder.

The pad(s) may comprise reticulated foam placed on the internal wall of the bladder so as not to disrupt the internal symmetry of the ball as provide in U.S. patent application Ser. No. 11/363,618, the disclosure of which is incorporated herein by reference in its entirety.

The inflatable articles or sportsballs comprising a dip-molded and heat-set neoprene latex inner bladder exhibit (i) a substantially geometric shape, (ii) excellent low-temperature elastic deformation and recovery, and (iii) excellent air pressure retention attributes. The process of forming the bladders comprises the ability to fabricate a penultimate dip-molded latex balloon that is incompletely cured and capable of being heat-set to the desired geometrical shape, for example a spherical hollow bladder shell, in a discrete secondary cure process.

The neoprene latex dip molding of the present invention is compatible with state-of-the-art latex dipping calcium nitrate coagulants, produces products with superior air barrier properties as compared to butyl rubbers, with superior tensile strength as compared to natural rubbers, and with superior elongation as compared to natural rubber latex films. The bladders and molding process of the present invention are also compatible with state-of-the-art rubber cement like Ashland Chemical's Pliobond 20 which may be used for sealing the valve house to the neoprene latex rubber balloon to form a completed ball inner liner.

In a preferred embodiment, a superior neoprene latex dip molded and heat set inflatable bladder is formed using a novel mold former of metal fabricated with a multiple baffle design such that the resulting inflated but un-stretched balloon's outer surface approximates a ribbed substantially spherical shape having nearly equal polar and equatorial diameters of 186 mm×183 mm with a proximal neck diameter of 35 mm. The dip molded bladder is cured between 90% and 97% and then stripped from the mold. The resulting heat set inflatable bladder, first formed by dip molding, then post cured in a 186 mm diameter spherical pressurized heat mold, exhibits superior rebound coupled with penultimate geometrical shape and superior air retention. The resulting neoprene latex balloon exhibits lower tear resistance than natural latex and may tear or stretch without recovering to its prior shape during the process of stripping the balloon from the mold. Accordingly, the size of the proximal neck diameter may be varied to facilitate proper stripping of the balloon and reduce tearing or stretching.

In another embodiment, a novel mold former of metal is fabricated with a multiple baffle design such that the resulting inflated but un-stretched balloon's outer surface approximates a ribbed spherical shape having nearly equal polar and equatorial diameters of 186 mm×183 min with a proximal neck diameter of 55 mm. The dip molded bladder is cured between 90% and 97% and is easily stripped from the mold. The added proximal neck diameter reduces the mold stripping problem.

In another embodiment, a neoprene latex dip molded and heat set inflatable bladder is used in a sportsball with a floating cover. A bladder used in a sportsball with a floating cover is described in U.S. Pat. No. 6,645,100, the disclosure of which is incorporated herein by reference in its entirety. A ball construction with a floating cover necessarily requires an inner bladder having a geometrical penultimate shape similar to the desired shape of the sportsball. The only state-of-the-art process for manufacturing such a bladder is the dry rubber molding process. Traditional dip mold manufacturing processes will not work as dip molded latex bladders cannot exhibit geometrical penultimate shape. Moreover, attaching a plurality of lining sheets which substantially cover the misshaped bladder does not improve the shape. Because most lining sheets, e.g. woven sheets, are essentially stiff and do not stretch, the resulting ball cannot be made to take on its spherical shape in the subsequent carcass molding step. In light of these construction difficulties, the ideal bladder for a sportsball with a floating cover is a bladder having a geometric shape similar to the desired shape of the sportsball.

The present invention enables the use of dip molded latex rubber bladders comprising a penultimate geometrical shape similar to the desired shape of the sportsball for use in sportsballs with floating covers. The neoprene bladder-floating cover sportsballs may be manufactured using laminated, machine-stitched or hand-stitched sportsball methods. The resulting sports balls, like soccer balls and volleyballs with floating covers, exhibit superior liveliness and responsiveness coupled with persistent geometrical shape retention and superior air retention.

The present invention also provides for a laminated basketball comprising a neoprene latex dip molded and heat set inflatable bladder. A laminated basketball is described in U.S. Pat. No. 7,503,861, the disclosure of which is incorporated herein by reference in its entirety. The laminated basketball of U.S. Pat. No. 7,503,861 comprises a winding thread layer surrounding the bladder, a carcass having an inner face adjacent to said winding thread layer and an outer face and a plurality of external cover panels, each affixed to the outer face of the carcass. The fiber wound construction requires an inner bladder having a geometrical penultimate shape. Over the fiber windings, the carcass rubber may be applied and the assembly may be cured in an inflated carcass mold at 165° C. for about 10 minutes to about 12 minutes. The laminated panels may then be applied to the carcass surface with adhesive cement and pressed into position. Again, the only state of-the-art source for such a bladder is the dry rubber molding process. And again, traditional dip mold manufacturing processes will not work because dip molded latex bladders never exhibit geometrical penultimate shape. Moreover, attaching winding such a misshapen bladder does not improve the shape. Because the windings, e.g. nylon and polyester, are essentially stiff and will not stretch, the resulting ball cannot be made to take on its spherical shape in the subsequent carcass molding step. In light of these construction difficulties, the ideal bladder for a laminated basketball is a bladder having a geometric shape similar to the desired shape of the sportsball. The present invention enables the use of dip molded latex rubber bladders comprising a penultimate geometrical shape similar to the desired shape of the sportsball for use in basketballs manufacturing processes. The resulting basketball exhibits superior liveliness and responsiveness coupled with persistent geometrical shape retention and superior air retention.

Similarly, the present invention also provides for a rubber covered basketball comprising a neoprene latex dip molded and heat set inflatable bladder. In this embodiment, rubber coverings may be used instead of the adhesively attached laminated panels. Green rubber panels may be placed onto the ball surface which is over molded at about 165° C. for an additional 8 minutes.

Likewise, the present invention enables the use of dip molded latex rubber bladders comprising a penultimate geometrical shape similar to the desired shape of the sportsball for use in sportsballs with a conventional hand-stitched casing. The resulting sports balls, like soccer balls and rugby balls, exhibit superior liveliness and responsiveness coupled with persistent geometrical shape retention and superior air retention.

The present invention also enables the use of dip molded latex rubber bladders comprising a penultimate geometrical shape similar to the desired shape of the sportsball for use in sportsballs with conventional machine-stitched casing with fiber windings. The resulting sports balls, like soccer balls, gridiron footballs and volleyballs exhibit superior liveliness and responsiveness coupled with persistent geometrical shape retention and superior air retention.

In another embodiment, the present invention also enables the use of dip molded latex rubber bladders comprising a penultimate geometrical shape similar to the desired shape of the sportsball for use in sportsballs with a conventional thermal bonded casing. The resulting sports balls, like soccer balls and volleyballs exhibit superior liveliness and responsiveness coupled with persistent geometrical shape retention and superior air retention.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The disclosed bladder, and related manufacturing method, is capable of use in numerous articles. It is to be understood that the disclosure is not limited in the express embodiments or examples described in herein. Also, it is to be understood that the phraseology and terminology employed herein are for the purpose of descriptions and should not be regarded as limiting. Those skilled in the art will appreciate that the conception, upon which this disclosure is based, may readily be utilized as a basis for the designing of other structures, methods and systems for carrying out the several purposes of the present development. It is important that the present invention be regarded as including such equivalent constructions insofar as they do not depart from the spirit and scope of the disclosure. One skilled in the art will recognize that numerous variations or changes may be made to the process described above without departing from the scope of the present invention. Accordingly, the foregoing description of preferred embodiments and following examples are intended to describe the invention in an exemplary, rather than a limiting, sense.

Optionally, the neoprene bladder may be post-cured by conventional means but not heat-set. In one embodiment, the finished bladders may be placed in a bulk oven set to about 110° C. for about 12 hours. Heat-set only bladders have a preferred shape but will still have concave and convex regions or "ribs". Therefore, heat-set only bladders may be most useful for hand stitched ball manufacturing.

EXAMPLES

Examples 1-4 and 7-13

Neoprene balloons were prepared with various dip mold designs. These preparations are similar to the method taught by Jain et al in U.S. Pat. No. 6,949,276, the disclosure of which is incorporated herein by reference in its entirety. A metal dipping mold was washed to remove all dust and all extraneous material by dipping it into acid and alkali followed by washing with water. The washed and cleaned former was then dipped in a first coagulant bath comprising a solution of calcium nitrate, calcium chloride, talcum powder and water at about 50° C. Upon removal from the first coagulant bath the former was dried at room-temperature. Once cooled the former was dipped into a 30° C. neoprene latex bath comprising aqueous neoprene latex, sulfur and dithiocarbamates, antioxidants, zinc oxide; viscosity modifiers and wetting agents, liquid paraffin and china clay for several minutes. The coated former was removed from the latex bath and dried at room-temperature. The dried former was then leached by washing in hot water for 10 minutes to remove extraneous chemicals present on the surface. The leached former was then dried in drying oven set below 100° C. The dried former was thereafter vulcanized in an oven where the temperature was maintained above 100° C. Unlike conventional latex dipping, upon reaching 95% cure, the formers were then cooled to room-temperature in open air. The finished balloon was manually stripped from the mold and was subsequently rinsed with room-temperature water. In contrast to the previously referenced disclosure by Jain et al. and the prior art in conventional latex dipping, the balloon was not thereafter subjected to post stripping curing in rough tumblers set to elevated temperatures for extended periods of time. These neoprene balloons were left partially uncured rather than fully cured. The final cure was left for a different process altogether.

Next, a suitable and commercially available rubber cement was applied to the exterior annulus of the partially uncured balloons and to the matching flanges of an appropriately sized valve house closure. The solvent was allowed to evaporate while exposed to 65° C. air for 5 minutes. Subsequently, the two cemented surfaces were contacted and pressure was applied forming a tight bond. The conjugation of these two components formed a partially cured bladder with an approximate but not geometrically spherical penultimate shape. This bladder was then inserted into a conventional dry rubber inflated bladder mold, having a polar and equatorial perimeter slightly larger that of the penultimate dip molded balloon, for final cure and heat setting to an idealized geometrical shape.

The following table summaries different examples of the neoprene latex bladders prepared:

| Ex | Latex Rubber | Flights | Penultimate Dip mold Dimensions (mm) | Bladder mass (g) | Dip Mold Neck (mm) | Dip Mold Cure (%) | Post-Cure Inflated Mold Dia (mm) | Results |
|---|---|---|---|---|---|---|---|---|
| 1 | Neoprene | 4 | 172 × 170 | 85 | 35 | 100 | 177 | Burst in post cure mold |
| 2 | Neoprene | 4 | 172 × 170 | 85 | 35 | 100 | 186 | Burst in post cure mold |
| 3 | Neoprene | 4 | 172 × 170 | 85 | 35 | 95 | 177 | Burst in post cure mold |
| 4 | Neoprene | 4 | 172 × 170 | 85 | 35 | 90 | n/a | damaged while stripping from dip mold |
| 5 | Neoprene/Natural | 4 | 172 × 170 | 85 | 35 | 100 | 177 | remained in penultimate shape |
| 6 | Neoprene/Natural | 4 | 172 × 170 | 85 | 35 | 90 | 177 | remained in penultimate shape |
| 7 | Neoprene | 7 | 186 × 183 | 85 | 55 | 90 | n/a | damaged while stripping from dip mold |
| 8 | Neoprene | 7 | 186 × 183 | 85 | 55 | 95 | 186 | heat set to ideally spherical bladder |
| 9 | Neoprene | 7 | 186 × 183 | 85 | 35 | 95 | 186 | heat set to ideally spherical bladder |
| 10 | Neoprene | 7 | 184 × 183 | 85 | 35 | 95 | 186 | heat set to ideally spherical bladder |
| 11 | Neoprene | 8 | 189 × 150 | 85 | 35 | 95 | 186 | Burst in post cure mold |
| 12 | Neoprene | 8 | 184 × 183 | 85 | 35 | 95 | 186 | heat set to ideally spherical bladder |
| 13 | Neoprene | 7 | 186 × 183 | 85 | 55 | 95 | 186 | heat set to ideally spherical bladder |

Examples 5 and 6 were conducted on a variation of the bladder shell taught by Jain et al. with a lamination of a layer of neoprene latex plus a layer of natural rubber latex.

Example 14

Neoprene latex bladders were prepared with aqueous polyvinyl-alcohol barrier coatings. The bladder prepared in Example 8 was subsequently coated with an aqueous solution of polyvinyl alcohol sold under the brand name Hi-Float® as described by U.S. Pat. No. 5,244,429, the disclosure of which is incorporated herein by reference in its entirety. The coating uniformly and adequately wetted the surface of the neoprene latex bladder. The finished bladder was bounce tested and the balloon wall was evaluated for air pressure retention. The room-temperature and low-temperature rebound as well as air retention metrics are presented in Table 1. The rebound was diminished but the air retention results were superior to Example 8.

Example 15

Neoprene latex bladders were prepared with butyl latex based barriers. The bladder prepared in Example 8 was subsequently coated with butyl latex rubber dispersion from Lord, sold under the trade name Aqualast BL-100 which is analogous to the neat butyl latex barrier disclosed in U.S. Pat. No. 6,232,389, the disclosure of which is incorporated herein by reference in its entirety. The butyl latex coating did not adequately coat the inner surface of the cured neoprene latex bladder. The finished bladder was bounce tested and the balloon wall was evaluated for air pressure retention. The room-temperature and low-temperature rebound as well as air retention metrics are presented in Table 1. The rebound and air retention results were not distinguished from Example 8.

Example 16

Neoprene latex bladders were prepared with nitrile latex based barriers. The bladder prepared in Example 8 was subsequently coated with nitrile latex barrier dispersion from Reichold, Inc. sold under the trade name TYLAC-6807300 which is analogous to the neat nitrile latex barrier disclosed in U.S. Pat. No. 7,078,453, the disclosure of which is incorporated herein by reference in its entirety. This film did not contain filler and was made for reference. The nitrile latex coating did not uniformly nor adequately coat the inner surface of the cured neoprene latex bladder. The finished bladder was bounce tested and the balloon wall was evaluated for air pressure retention. The room-temperature and low-temperature rebound as well as air retention metrics are presented in Table 1. The rebound and air retention results were not distinguished from Example 8.

Example 17

Neoprene latex bladders were prepared with neoprene latex based barriers. The bladder prepared in Example 8 was subsequently coated with neoprene latex barrier dispersion from Killian Latex, in Akron Ohio sold under the private label trade name Nitroblock® which is registered to Primo Sport, Holdings, LLC. This neoprene latex is analogous to the neat neoprene latex barrier disclosed in U.S. Pat. No. 7,078,453, example 13. This film did not contain filler and was made for reference. The external neoprene latex coating did uniformly and adequately coat the inner surface of the cured neoprene latex bladder. The finished bladder was bounce tested and the balloon wall was evaluated for air pressure retention. The room-temperature and low-temperature rebound as well as air retention metrics are presented in Table 1. The rebound and air retention results were not distinguished from Example 8.

Example 18

Neoprene latex based barriers were prepared with exfoliated clay additives. The bladder prepared in Example 8 was prepared by first applying a thin coating of a suspension of exfoliated clay and neoprene latex. The exfoliated clay was purchased as an aqueous suspension of 2.5% solids, sold by Southern Clay Products, Inc under the trade name Cloisite Na+. The neoprene latex barrier dispersion was purchased from Killian Latex, in Akron Ohio sold under the private label trade name Nitroblock® which is registered to Primo Sport, Holdings, LLC. The mixture was prepared by balancing the pH of the two aqueous materials and mixing under slow shear. This neoprene latex is analogous to the filled neoprene latex barrier disclosed in U.S. Pat. No. 7,078,453, examples 14 through 21. Somewhat analogous to U.S. Pat. No. 6,544,608 with a lamination of a layer of neoprene latex plus a layer of natural rubber latex, here a first layer of barrier coating was followed by a second and more substantial build up of neat Nitroblock® latex. This provided a bladder with an internal coating of a neoprene plus exfoliated clay barrier in on the innermost surface of an otherwise neoprene bladder. The resulting air permeability was surprisingly low. The finished bladder was bounce tested and the balloon wall was evaluated for air pressure retention. The room-temperature and low-temperature rebound as well as air retention metrics are presented in Table 1. The rebound was not distinguished but the air retention results were improved compared to the results from Example 8.

Example 19

Neoprene latex bladders were prepared with rubber cement barriers. The bladder prepared in Example 8 was subsequently painted with a rubber cement barrier coating comprising a green dry milled rubber compound dissolved in Xylene and Toluene with respective weight percentages of 66%:17%:17%. This film did contain a substantial weight percentage of carbon black filler. The external butyl latex coating did uniformly and adequately coat the outer surface of the cured neoprene latex bladder. The finished bladder was bounce tested and the balloon wall was evaluated for air pressure retention. The room-temperature and low-temperature rebound as well as air retention metrics are presented in Table 1. The rebound and air retention results were not distinguished from Example 8.

Example 20

Neoprene latex bladders were prepared with acoustical reticulated foam pads. The bladder prepared in Example 8 was subsequently inverted between the dip molding and post curing and a plurality of reticulated foam pads were adhered to the inner surface of the balloon. This foam pad installation is useful for producing Inflatable Articles that Provide Long Term Inflation and Pressure Control as disclosed in U.S. patent application Ser. No. 11/363,618. This bladder was subsequently turned inside out and post cured according to the remaining processing conditions. A finished molded volleyball was manufactured with this prototype and the sound attenuation properties described in the prior art were observed. The finished bladder was bounce tested and the balloon wall was evaluated for air pressure retention. The room-temperature and low-temperature rebound as well as air retention metrics are presented in Table 1. The rebound and air retention results were not distinguished from Example 8.

Example 21

Neoprene latex bladders were prepared as in Example 8 except that the latex dipping solution contained 10% by weight (solids basis) H20/1000 Glass Microspheres from 3M, Inc. Special care was taken to ensure that the neoprene latex bath remained agitated by paddle mixing otherwise the glass spheres would float to the surface and would not be in place when the coagulation process occurred. The finished bladder was bounce tested and the balloon wall was evaluated for air pressure retention. The room-temperature and low-temperature rebound as well as air retention metrics are presented in Table 1. The rebound was deficient compared to Example 8 but the air retention results were superior to Example 8.

Example 22

Measurements of several of the most common bladder materials, inclusive of the inventive compositions, are provided in Table 1.

Rebound Tests:

For the room-temperature rebound height test, a penultimate bladder is conditioned to 20° C. Then it is dropped onto a concrete floor from an elevation of 72 inches. With a video camera and a scale behind the ball, the bounce height of the first and second bounces is noted. This is bounce test is repeated at least two times to provide an average rebound height in inches.

For the low-temperature rebound height test, the penultimate ball is inserted into a freezer set to minus 10° C. and left for 10 minutes. The bladder is removed from the freezer and the test is conducted identically to the room-temperature rebound height test.

Air Pressure Tests:

The air pressure retention test is conducted by water column displacement through a bladder sample. A 50 psig air pressure gradient is applied to one side of a rubber bladder sample which is clamped two flanged fixtures and is supported by a stiff wire screen situated perpendicular to the pressure gradient. The area is fixed at 1.76 square inches. A time-lapse camera captures the water column level at hourly intervals. After the air has displaced the water beyond the column graduations, the number of hours elapsed divided by the measured water column displacement noted for each sample. These values must be carefully calibrated by a control experiment which indicates the water displaced only by changes in barometric pressure between the start and end of the trials. At least three, but as many as several dozen repeats are averaged to provide the nominal air pressure retention indicated in the table. These air pressure retention values are not normalized for thickness, because all samples were made from 75 gram bladders, which are the industry, standard for the most ubiquitous sizes of inflated sportsballs. Due to differences in rubber density, some samples were thicker or thinner than others but all came from 75 gram bladders.

In general, neoprene latex is superior to all other latex materials for the balance of properties. Neoprene latex is superior to all other dry rubber materials for balance of properties. Neoprene latex bladders of the present invention offer the very best balance of all properties.

TABLE 1

| | Inflated Bladder Type | Bladder Rebound at 20 deg C. (in) | Bladder Rebound at −10 deg C. (in) | Bladder Air Retention (hrs/cc) |
|---|---|---|---|---|
| A | Neoprene Latex w/PVOH Coating Example No. 14 | 35 | 30 | 110-120 |
| B | Neoprene Latex w/Cloisite Na+ Example No. 18 | 37 | 34 | 90-100 |
| C | Neoprene Latex w/10% Glass Spheres Example No. 21 | 32 | 30 | 70-80 |
| D | Neoprene Latex Example No. 8 | 37 | 34 | 50-60 |
| E | Neoprene Latex w/Butyl Latex Coating Example No. 15 | 37 | 34 | 50-60 |
| F | Neoprene Latex w/Nitrile Latex Coating Example No. 16 | 37 | 34 | 50-60 |
| G | Neoprene Latex w/Neoprene Latex Coating Example No. 17 | 37 | 34 | 50-60 |
| H | Neoprene Latex w/Butyl Cement Coating Example No. 18 | 37 | 34 | 50-60 |
| I | Neoprene Latex w/Acoustical Reticulated Foam Pads Example No. 20 | 37 | 34 | 50-60 |
| J | Premium Butyl Rubber (Dry) | 23 | 9 | 50-60 |
| K | Neoprene/Natural Latex Laminate w/Cloisite Na+ | 35 | 34 | 45-55 |
| L | Neoprene/Natural Latex Laminate Example No. 5 | 35 | 34 | 20-30 |
| M | Nitrile Latex | 33 | 9 | 20-25 |
| N | Butyl/Natural Rubber (Dry) | 20 | 12 | 20-40 |
| O | Pure Natural Latex | 35 | 34 | 5-10 |
| P | Natural Rubber (Dry) | 34 | 12 | 5-10 |

Example 23

Using known techniques in the prior art, neoprene latex coated inflatable bladders were prepared. Three trials were performed using the parameters shown in the table below. Notably, the number of mold flights ranged between 4-6 and the size of the mold neck ranged from 18-28 mm.

| Trial | Dipping Rubber | Mold flights (no.) | Mold neck (mm) | Mold neck (in) | Valve House Dia. (mm) | Valve House Dia. (in) | Mold Stripping Quality | Valve House Flange Seal Quality |
|---|---|---|---|---|---|---|---|---|
| 1 | neoprene latex | 4 | 18 | 0.71 | NA | NA | Tear | Not Feasible |
| 2 | neoprene latex | 6 | 19 | 0.75 | NA | NA | Tear | Not Feasible |
| 3 | neoprene latex | 6 | 28 | 1.10 | NA | NA | Set | Not Feasible |

The following table lists the results of dip molded films on inflatable bladders using three common materials and the present neoprene latex coating.

| Dip Molded Film Characteristics | Polyurethane Rubber Latex Films | Silicon Rubber Films | Natural Rubber Latex Films | neoprene latex |
|---|---|---|---|---|
| Tensile (psi) | 3000-5500 | 800-1500 | 4400-4900 | 3000-4000 |
| Elongation (%) | 400-1000 | 600-1100 | 800-1200+ | 700-800 |
| Tear Strength (pil) | 330-380 | 100-280 | 230-370 | 110-170+ |
| Tensile set @ 30% | 2-10% | 1-5% | 0-2% | 2-15% |
| UV Resistance | Good | Good | Poor | Good |
| Chemical Resistance | Good | Good | Poor | Good |
| Bondability | Good | Moderate | Poor | Good |
| Air Barrier Properties | Poor | Very Poor | Very Poor | Excellent |

Example 24

Using known techniques in the prior art, neoprene latex coated inflatable bladders were prepared. Two trials were performed using the parameters shown in the table below. Notably, the number of mold flights ranged between 7-8 and the size of the mold neck ranged from 38-50 mm.

| Trial | Dipping Rubber | Mold flights (no.) | Mold neck (mm) | Mold neck (in) | Valve House Dia. (mm) | Valve House Dia. (in) | Mold Stripping Quality | Valve House Flange Seal Quality |
|---|---|---|---|---|---|---|---|---|
| 4 | neoprene latex | 8 | 50 | 1.97 | NA | NA | Good | Not Applicable |
| 5 | neoprene latex | 7 | 38 | 1.50 | 75 | 2.95 | Good | Good |

Example 25

The following describes an example recipe for preparing a neoprene latex coated inflatable bladder. Initially, a 50.0 g mixture was prepared according to the table below. The 60% neoprene latex was added first and stirred at a setting high enough to move the surface well but before forming a vortex. Next, the other ingredients were added slowly in the order listed in the table while stirring. The stirring time between addition of each ingredient was approximately 2 minutes.

| Ingredient | % | grams | description |
|---|---|---|---|
| 60% neoprene latex | 91.4 | 45.68 | |
| 10% KOH | 2.8 | 1.42 | 10% KOH |
| Darvan WAQ | 0.6 | 0.28 | Darvan WAQ |
| Akrosperse W-9944 | 0.8 | 0.42 | Aq. Dispersion Sulfur (68%) |
| Akrosperse W-9750 | 1.1 | 0.57 | Zinc diethyldithiocarbamate |
| Akrosperse W-9989 | 0.9 | 0.47 | Aq. Dispersion ZnO (60%) |
| Akrosperse W-9924 | 1.1 | 0.57 | Antioxidant 12 |
| Akrosperse W-9753 | 1.2 | 0.59 | Aq. Dispersion Wax (48%) |

After all the ingredients have been added, the solution is stirred for approximately 2 hours without creating a vortex. Thereafter, the stirring is stopped and the mixture is covered and sealed well to prevent drying. The mixture is aged/matured for 1 day prior to use.

What is claimed is:

1. An inflatable sportsball bladder comprising:
   neoprene latex,
   wherein upon inflation to a penultimate state, the bladder has a geometric spherical or polygonal spheroid shape having less than 2% bladder sphericity and the bladder has a seamless exterior bladder surface, and
   wherein the bladder exhibits air retention of at least 50 hrs/cc.

2. The inflatable sportsball bladder of claim 1, wherein upon inflation to said penultimate state said bladder is substantially identical to the shape of the inner shell of a spherical sportsball.

3. The inflatable sportsball bladder of claim 1, further comprising a barrier layer.

4. The inflatable sportsball bladder of claim 1, wherein the bladder is formed by dip molding.

5. The inflatable sportsball bladder of claim 1, wherein the bladder is heat-set to its final shape by inflation mold curing.

6. A sportsball comprising the inflatable sportsball bladder of claim 1.

7. The inflatable sportsball bladder of claim 1 wherein the bladder is constructed entirely from neoprene latex.

8. The inflatable sportsball bladder of claim 1 wherein the bladder is constructed from neoprene latex without any rubber additives in the bladder.

9. The inflatable sportsball bladder of claim 1 wherein upon inflation to said penultimate state the bladder has a continuous and uniform exterior surface.

10. The inflatable sportsball bladder of claim 1 comprising an acoustical pad joined with the bladder.

11. The inflatable sportsball bladder of claim 1 comprising at least one of a floating cover and a rubber cover disposed over the exterior bladder surface.

12. The inflatable sportsball bladder of claim 1 wherein the bladder is constructed from a neoprene latex film having a tensile strength of 3000 psi to 4000 psi.

13. The inflatable sportsball bladder of claim 1 wherein the bladder is constructed from a neoprene latex film having a tear strength of 110 pil to 170 pil.

14. The inflatable sportsball bladder of claim 1 wherein the bladder is constructed from a neoprene latex film having tensile set at 30% of 2% to 15%.

* * * * *